(12) United States Patent
 Kodaira

(10) Patent No.: US 10,598,909 B2
(45) Date of Patent: Mar. 24, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Masakazu Kodaira, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/267,510

(22) Filed: Sep. 16, 2016

(65) Prior Publication Data

US 2017/0090165 A1  Mar. 30, 2017

(30) Foreign Application Priority Data

Sep. 30, 2015 (JP) ................................ 2015-194523

(51) Int. Cl.
 *G02B 15/14* (2006.01)
 *G02B 5/00* (2006.01)
 (Continued)

(52) U.S. Cl.
 CPC ........... *G02B 15/142* (2019.08); *G02B 5/005* (2013.01); *G02B 15/20* (2013.01); *G02B 27/0025* (2013.01)

(58) Field of Classification Search
 CPC .... G02B 15/173; G02B 15/167; G02B 15/22; G02B 15/163; G02B 15/20; G02B 27/646;
 (Continued)

(56) References Cited

U.S. PATENT DOCUMENTS 5,757,554 A * 5/1998 Fukami ................ G02B 15/173
 359/684
5,760,967 A * 6/1998 Terasawa ............. G02B 15/173
 359/684
(Continued)

FOREIGN PATENT DOCUMENTS

EP 0751414 A2 1/1997
JP 2005249974 A 9/2005
(Continued)

OTHER PUBLICATIONS

Extended European Search Report issued in European Patent Application No. 16002002.0 dated Jan. 31, 2017.
Office Action issued in Chinese Appln. No. 201610855612.8 dated Feb. 28, 2019. English translation provided.

*Primary Examiner* — Mahidere S Sahle
(74) *Attorney, Agent, or Firm* — Rossi, Kimms & McDowell LLP

(57) ABSTRACT

A zoom lens includes in order from an object side to an image side, a positive first lens unit that is not moved for zooming, a negative second lens unit that is moved during zooming, at least one zooming lens unit that is moved during zooming, a stop, and a positive fixed lens unit that is not moved for zooming. The first lens unit includes in order from the object side to the image side, a first lens sub-unit that is not moved for focusing, a positive second lens sub-unit that is moved toward the object side when focusing to an object at short distance from an object at infinite distance, and a positive third lens sub-unit that is moved during focusing. The second lens sub-unit includes a negative meniscus lens having a convex surface facing the image side.

6 Claims, 16 Drawing Sheets

(51) Int. Cl.
*G02B 15/20* (2006.01)
*G02B 27/00* (2006.01)

(58) Field of Classification Search
CPC .. G02B 13/009; G02B 13/0045; G02B 5/005; G02B 7/10; G02B 7/102; G02B 7/023; G03B 3/00; G03B 13/32; G03B 2205/0046; G03B 2205/0015; H04N 5/23296
USPC .................................. 359/676–706, 822–826
See application file for complete search history.

(56) References Cited

U.S. PATENT DOCUMENTS

| | | |
|---|---|---|
| 7,085,069 B2 | 8/2006 | Toyama |
| 7,505,213 B2 | 3/2009 | Tsutsumi et al. |
| 9,001,256 B2 | 4/2015 | Shimomura |
| 9,207,439 B2 | 12/2015 | Eguchi |
| 2012/0019930 A1* | 1/2012 | Yamanashi .......... G02B 15/173 359/684 |
| 2015/0131164 A1 | 5/2015 | Wakazono et al. |

FOREIGN PATENT DOCUMENTS

| | | |
|---|---|---|
| JP | 2008040395 A | 2/2008 |
| JP | 4469625 B2 | 5/2010 |
| JP | 2014038235 A | 2/2014 |
| JP | 2015018083 A | 1/2015 |

\* cited by examiner

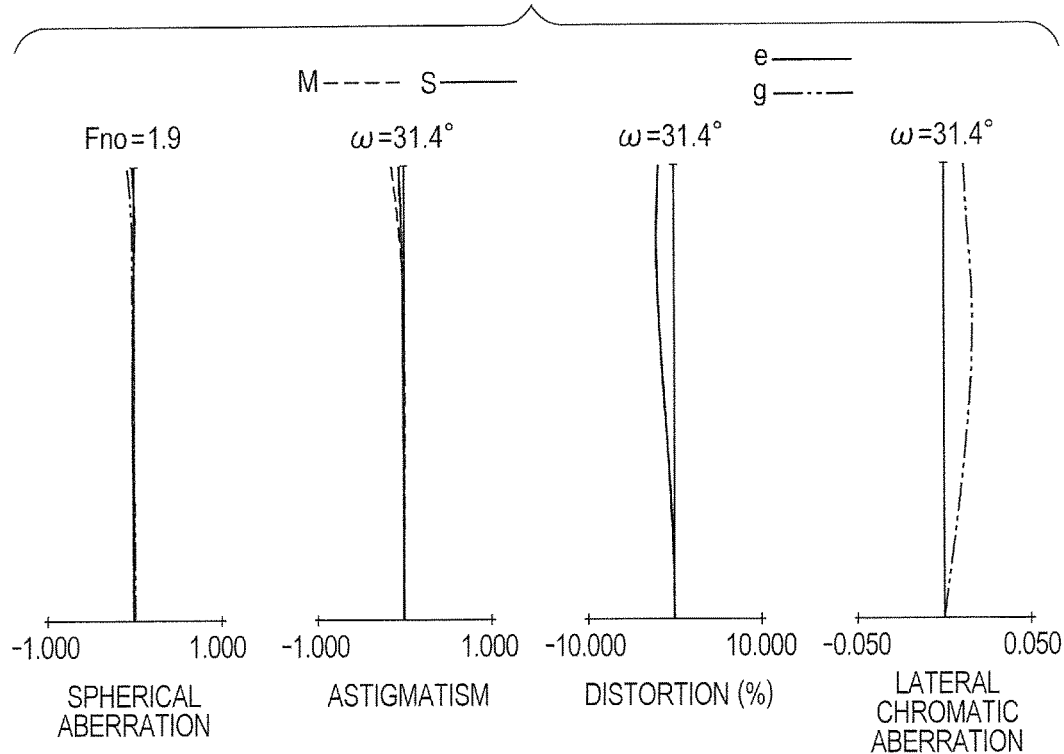
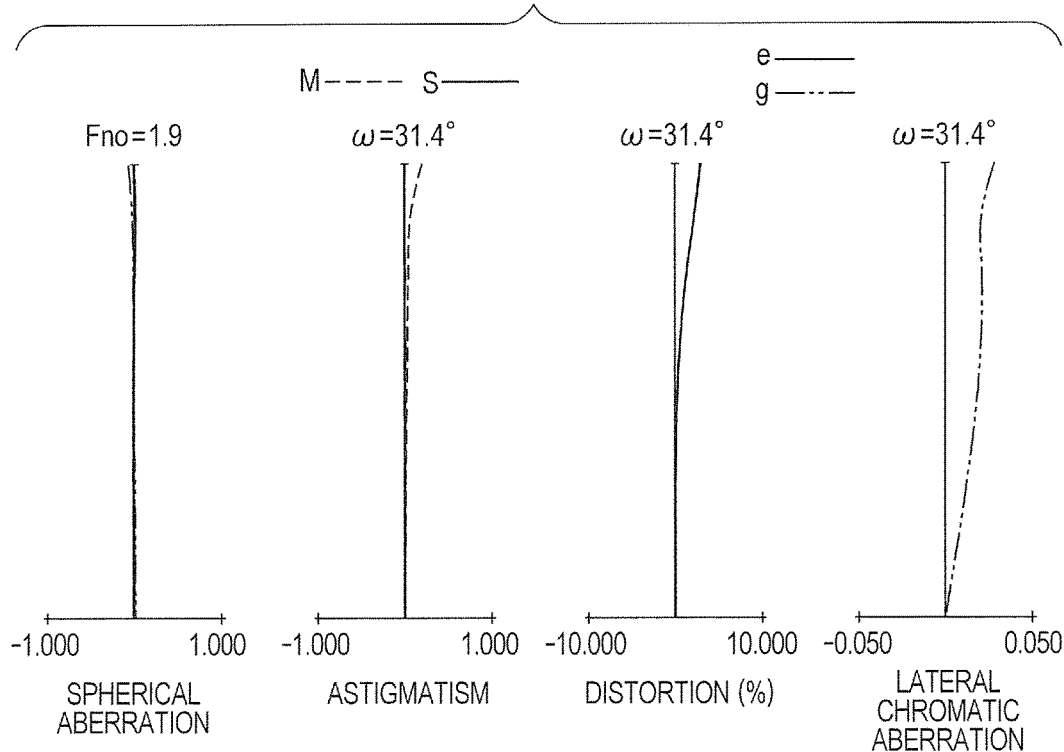

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for a television broadcast camera, a video camera, a digital still camera, a silver-halide film camera, and so on.

Description of the Related Art

In recent years, a compact zoom lens having a large aperture ratio (large F-number) and a large zoom ratio, and achieving high optical performance has been demanded for an image pickup apparatus such as a television camera, a silver-halide film camera, a digital still camera, and a video camera. As a general zoom lens having a large aperture ratio and a large zoom ratio, there has been known a positive-lead type four-unit zoom lens including four lens units as a whole, in which the lens unit disposed closest to an object has a positive refractive power. This four-unit zoom lens is known to have a configuration in which a first lens unit for focusing, a second lens unit having a negative refractive power for zooming, a third lens unit for correcting image plane variations due to zooming, and a fourth lens unit having a positive refractive power for image formation are arranged in this order from the object side to the image side.

For example, in Japanese Patent No. 4469625, a first lens unit is divided into a first negative lens sub-unit G11, a second positive lens sub-unit G12, and a third positive lens sub-unit G13, which are arranged in this order from the object side. Japanese Patent No. 4469625 proposes an inner-focus type zoom lens that performs focusing by moving the second positive lens sub-unit G12 on the optical axis.

With resolution enhancement of pixels of an image pickup element, there has been a demand for high optical performance over all the zoom range and all the focus range. In order for the aforementioned positive-lead type zoom lens to achieve both a reduction in size and high optical performance, it is necessary to appropriately set the refractive powers of the respective lenses and the lens configuration, particularly the power arrangement and the lens configuration in the first lens unit.

According to Japanese Patent No. 4469625, the first lens unit is provided with an increased number of lenses to enhance the design latitude for aberration correction so that the zoom lens can achieve higher performance. The first lens unit, however, includes the lenses having large effective diameters, and accordingly the increase in the number of lenses in the first lens unit entails an increase in the weight of the entire product.

SUMMARY OF THE INVENTION

Under these circumstances, the present invention has an object to provide a zoom lens equipped with a first lens unit in which the power arrangement and the lens configuration are appropriately set to reduce aberrations due to zooming and focusing, thereby achieving reductions in size and weight while achieving high optical performance over all the zoom range and all the focus range.

In order to achieve the above object, a zoom lens according to the present invention includes in order from an object side to an image side: a first lens unit that has a positive refractive power and is not moved for zooming; a second lens unit that has a negative refractive power and is moved during zooming; at least one zooming lens unit that is moved during zooming; a stop; and a fixed lens unit that has a positive refractive power and is not moved for zooming. The first lens unit includes in order from the object side to the image side: a first lens sub-unit that is not moved for focusing; a second lens sub-unit that has a positive refractive power and is moved toward the object side when focusing to an object at short distance from an object at infinite distance; and a third lens sub-unit that has a positive refractive power and is moved during focusing. The second lens sub-unit includes a negative meniscus lens having a convex surface facing the image side.

According to the present invention, it is possible to obtain a zoom lens and an image pickup apparatus including the zoom lens, the zoom lens being provided with a first lens unit in which the power arrangement and the lens configuration are appropriately set to reduce variations of aberrations due to zooming and focusing, and thereby achieving reductions in size and weight.

Further features of the present invention will become apparent from the following description of exemplary embodiments with reference to the attached drawings.

BRIEF DESCRIPTION OF THE DRAWINGS

FIG. 2A is an aberration diagram of the zoom lens in Example 1 at the wide angle end in focusing to infinity.

FIG. 2B is an aberration diagram of the zoom lens in Example 1 at the wide angle end in focusing to minimum distance (950 mm away from the first surface).

DESCRIPTION OF THE EMBODIMENTS

Hereinafter, embodiments of the present invention are described in detail with reference to the accompanying drawings.

A zoom lens of the present invention includes in order from an object side to an image side, a first lens unit, a second lens unit, at least one zooming lens unit, a stop, and a fixed lens unit. The first lens unit has a positive refractive power and is not moved for zooming, the second lens unit has a negative refractive power and is moved during zooming, the at least one zooming lens unit is moved during zooming, and the fixed lens unit has a positive refractive power and is not moved for zooming. The first lens unit includes in order from an object side to an image side, a first lens sub-unit, a second lens sub-unit, and a third lens sub-unit. The first lens sub-unit is fixed in focusing, the second lens sub-unit has a positive refractive power and is moved toward the object side in focusing to an object at short distance from an object at infinite distance, and the third lens sub-unit has a positive refractive power and is moved toward the object side in focusing to the object at short distance from the object at infinite distance. In focusing to the object at short distance from the object at infinite distance, the second lens sub-unit and the third lens sub-unit are moved along different loci, and the second lens sub-unit includes a negative meniscus lens having a convex surface facing an image side.

Here, description is provided for optical effects in a case where the aforementioned focusing method is employed in the present invention.

Figure 12:
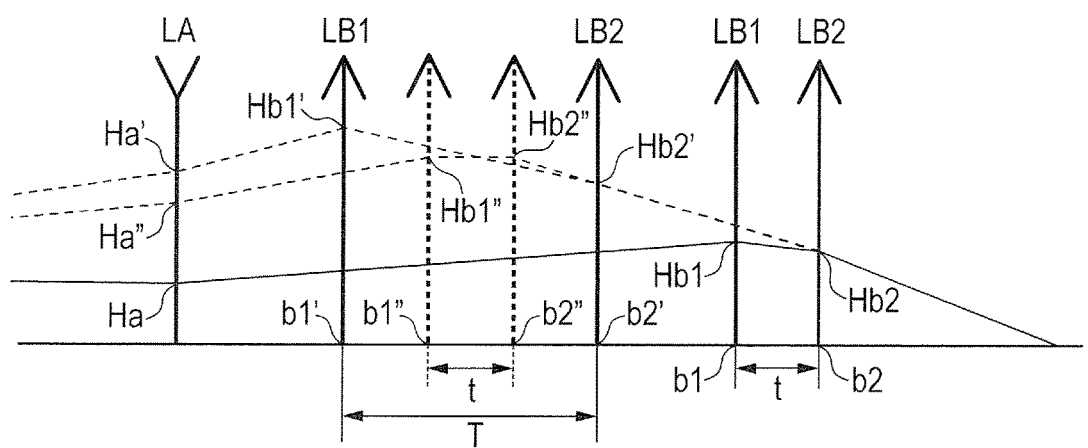
FIG. 12 is a paraxial arrangement diagram illustrating axial paraxial rays incident on a lens unit before and after focusing.

In the first place, with reference to FIG. 12, description is provided for problems in a focusing method of the conventional technique using floating in which multiple movement units are moved by respective different amounts to perform focusing to an object at minimum distance from an object at infinite distance.

A first lens unit L1 includes in the following order from an object side, a first lens sub-unit LA that is not moved for focusing, a second lens sub-unit LB1 that is moved in focusing, and a third lens sub-unit LB2 that is moved in focusing. In FIG. 12, a paraxial ray from an object at infinite distance is depicted by a solid line, b1 and b2 indicate the positions of the second lens sub-unit LB1 and the third lens sub-unit LB2 on the optical axis for the object at infinite distance, and t denotes a distance between b1 and b2. In addition, Ha, Hb1, and Hb2 indicate the paraxial ray heights in the first lens sub-unit LA, the second lens sub-unit LB1, and the third lens sub-unit LB2, respectively. Meanwhile, a paraxial ray from a certain object at finite distance is depicted by a dotted line, b1' and b2' indicate the positions of the second lens sub-unit LB1 and the third lens sub-unit LB2 on the optical axis for the certain object at finite distance, and T (t<T) denotes a distance between b1' and b2'. Then, Ha', Hb1', and Hb2' indicate the paraxial ray heights in the first lens sub-unit LA, the second lens sub-unit LB1, and the third lens sub-unit LB2, respectively. Here, an axial paraxial ray is defined as a paraxial ray obtained when light having a height of 1 from the optical axis of the optical system enters the optical system in parallel with the optical axis, provided that the focal length of the entire optical system is normalized to 1. A gradient of the ray is obtained by dividing a difference between the ray heights at the ends of a certain section by a length of the section. The following description is provided on the assumption that an object is located on the left side of the optical system, and the ray incident onto the optical system from the object side travels from the left to the right. An angle of incidence on the optical system is expressed with a plus sign for a clockwise angle and with a minus sign for an anti-clockwise angle when measured from the optical axis.

If the second lens sub-unit LB1 and the third lens sub-unit LB2 arranged with the same positional relationship as that for the object at infinite distance are positioned for the same certain object at finite distance with the distance t kept unchanged, the position of the second lens sub-unit LB1 on the optical axis is a position b1" which is on the image plane side of the position b1', and the position of the third lens sub-unit LB2 on the optical axis is a position b2" which is on the object side of the position b2'. Then, Ha", Hb1", and Hb2" denote the paraxial ray heights in the first lens sub-unit LA, the second lens sub-unit LB1, and the third lens sub-unit LB2, respectively.

Next, the paraxial ray heights of the second lens sub-unit LB1 and third lens sub-unit LB2 at t<T and at t=T have the following relationships:

$Hb1'>Hb1"$ $Hb2'>Hb2"$.

Here, according to the third-order aberration theory, a third-order aberration coefficient I of a spherical aberration is proportional to the fourth power of the paraxial ray height h, and a third-order aberration coefficient III of an astigmatism is proportional to the square of the paraxial ray height h. Accordingly, in the second lens sub-unit LB1 and the third lens sub-unit LB2, third-order aberration coefficients of the spherical aberration and an axial chromatic aberration are changed in the following ways, as t and T are changed from t=T to t<T.

[1] The second lens sub-unit LB1: the third-order aberration coefficient I of the spherical aberration is changed to the plus side, and the third-order aberration coefficient III of the astigmatism is also changed to the plus side. Thus, the spherical aberration is changed to be under-corrected and the astigmatism is also changed to be under-corrected.

[2] The third lens sub-unit LB2: the third-order aberration coefficient I of the spherical aberration is changed to the minus side, and the third-order aberration coefficient III of the astigmatism is also changed to the minus side. Thus, the spherical aberration is changed to be over-corrected and the astigmatism is also changed to be over-corrected.

The focusing method using floating makes tactful use of the aforementioned aberration variations caused by moving the second lens sub-unit LB1 and the third lens sub-unit LB2, and thereby reduces aberration variations due to focusing.

In general, in the focusing method using floating, a reduction in a difference between Hb1–Ha for the object at infinite distance and Hb1'–Ha' for the object at finite distance makes it possible to reduce the variations of the spherical aberration and the astigmatism. Moreover, by moving the third lens sub-unit LB2 to the image plane side, the spherical aberration and the astigmatism are over-corrected in focusing to an object at minimum distance.

Meanwhile, also in the focusing method using floating, there is a demand for further size reduction and further enhancement of optical performance. To achieve them, it is necessary to increase the power of the first lens sub-unit LA for the purpose of shifting the principal points of the first lens unit L1 toward the image side, and it is also necessary to increase the power of the second lens sub-unit LB1 high for the purpose of reducing a stroke length of a focusing unit in the second lens sub-unit LB1. If these power increases were done, however, Hb1'–Ha' for the object at finite distance may be too large with respect to Hb1–Ha for the object at infinite distance, and the variations of the spherical aberration and astigmatism may be excessively under-corrected. This may cause a problem of the occurrence of large variations of these aberrations in focusing.

In addition, when the powers of the first lens sub-unit LA and the second lens sub-unit LB1 are too high, the spherical aberration and the astigmatism in focusing to the object at minimum distance cannot be over-corrected by the third lens sub-unit LB2.

As a main solution to the aforementioned problems, the present invention provides a second lens sub-unit LB1 with a negative meniscus lens having a convex surface facing an image side, and thereby achieves a further reduction in size and further enhancement of optical performance even in the focusing method using floating.

Moreover, it is preferable to satisfy the following conditional expression:

$$-0.60<\varphi12n/\varphi12<-0.20 \tag{1}$$

The conditional expression (1) specifies a ratio of the negative refractive power of the meniscus lens having the convex surface facing the image side in the second lens sub-unit relative to the refractive power of the second lens sub-unit, thereby specifying a requirement for reductions in size and weight and reductions in aberration variations. In the conditional expression (1), $\varphi12n$ denotes the negative refractive power of the meniscus lens having the convex surface facing the image side in the second lens sub-unit, and $\varphi12$ denotes the refractive power of the second lens sub-unit. The numeral value range specified by the expression (1) is desirable in order for an optical system to achieve both reductions in size and weight and reductions in aberration variations. It is to be noted that, since the refractive power is defined as the reciprocal of the focal length, to shorten the focal length of a lens means to increase the refractive power of the lens, and to extend the focal length of a lens means to decrease the refractive power of the lens.

When the above ratio reaches the lower limit of the conditional expression (1), the negative refractive power of the meniscus lens is too low, whereas the refractive power of the second lens sub-unit is too high. When the negative refractive power of the meniscus lens is too low with respect to the refractive power of the second lens sub-unit, the aberrations are largely varied in focusing.

When the above ratio reaches the upper limit of the conditional expression (1), the refractive power of the meniscus lens is too high, whereas the refractive power of the second lens sub-unit is too low. When the negative refractive power of the meniscus lens is too high with respect to the refractive power of the second lens sub-unit, the stroke length of the focusing unit in the second lens sub-unit is so long that the optical system is increased in size and weight.

It is more preferable to satisfy a range specified by the following expression (1a) in the conditional expression (1):

$$-0.59<\varphi12n/\varphi12<-0.24 \tag{1a}$$

Moreover, it is desirable to satisfy the following conditional expression:

$$0.40<\varphi12/\varphi1<0.80 \tag{2}$$

The conditional expression (2) specifies a ratio of the refractive power of the second lens sub-unit to the refractive power of the first lens unit, thereby specifying a requirement for reductions in size and weight and reductions in aberration variations. In the conditional expression (2), $\varphi12$ denotes the refractive power of the second lens sub-unit, and $\varphi1$ denotes the refractive power of the first lens unit. The numeral value range specified by the expression (2) is desirable in order for an optical system to achieve both reductions in size and weight and reductions in aberration variations.

When the above ratio reaches the lower limit of the conditional expression (2), the refractive power of the second lens sub-unit is too low, whereas the refractive power of the first lens unit is too high. When the refractive power of the second lens sub-unit is too low with respect to the refractive power of the first lens unit, the stroke length of the second lens sub-unit in focusing is so long that the optical system is increased in size and weight.

When the above ratio reaches the upper limit of the conditional expression (2), the refractive power of the second lens sub-unit is too high, whereas the refractive power of the first lens unit is too low. When the refractive power of the second lens sub-unit is too high with respect to the refractive power of the first lens unit, the aberrations are largely varied in focusing.

It is more preferable to satisfy a range specified by the following expression (2a) in the conditional expression (2):

$$0.45<\varphi12/\varphi1<0.75 \tag{2a}$$

In addition, it is desirable to satisfy the following conditional expression:

$$0.20 < \varphi 13/\varphi 1 < 0.60 \tag{3}$$

The conditional expression (3) specifies a ratio of the refractive power of the third lens sub-unit to the refractive power of the first lens unit, thereby specifying a requirement for reductions in size and weight and reductions in aberration variations. In the conditional expression (3), φ13 denotes the refractive power of the third lens sub-unit, and φ1 denotes the refractive power of the first lens unit. The numeral value range specified by the expression (3) is desirable in order for an optical system to achieve both reductions in size and weight and reductions in aberration variations.

When the above ratio reaches the lower limit of the conditional expression (3), the refractive power of the third lens sub-unit is too low, whereas the refractive power of the first lens unit is too high. When the refractive power of the third lens sub-unit is too low with respect to the refractive power of the first lens unit, the stroke length in the third lens sub-unit in focusing is so long that the optical system is increased in size and weight.

When the above ratio reaches the upper limit of the conditional expression (3), the refractive power of the third lens sub-unit is too high, whereas the refractive power of the first lens unit is too low. When the refractive power of the third lens sub-unit is too high with respect to the refractive power of the first lens unit, the aberrations are largely varied in focusing.

It is more preferable to satisfy a range specified by the following expression (3a) in the conditional expression (3):

$$0.40 < \varphi 13/\varphi 1 < 0.51 \tag{3a}$$

Further, it is desirable to satisfy the following conditional expression:

$$0.50 < \varphi 12/\varphi 13 < 3.00 \tag{4}$$

The conditional expression (4) specifies a ratio of the refractive power of the second lens sub-unit to the refractive power of the third lens sub-unit, thereby specifying a requirement for reductions in aberration variations. In the conditional expression (4), φ12 denotes the refractive power of the second lens sub-unit, and φ13 denotes the refractive power of the third lens sub-unit. The numeral value range specified by the expression (4) is desirable in order to reduce aberration variations in focusing.

When the above ratio reaches the lower limit of the conditional expression (4), the refractive power of the second lens sub-unit is too low, whereas the refractive power of the third lens sub-unit is too high. As a result, the stroke length of the third lens sub-unit in focusing is so short that the optical system can be reduced in size, but, on the other hand, the aberrations may be largely varied in focusing.

When the above ratio reaches the upper limit of the conditional expression (4), the refractive power of the second lens sub-unit is too high, whereas the refractive power of the third lens sub-unit is too low. As a result, the stroke length of the second lens sub-unit in focusing is so short that the optical system can be reduced in size, but, on the other hand, the aberrations may be largely varied in focusing.

It is more preferable to satisfy a range specified by the following expression (4a) in the conditional expression (4):

$$0.80 < \varphi 12/\varphi 13 < 2.70 \tag{4a}$$

Furthermore, it is desirable to satisfy the following conditional expression:

$$3 < SF12n < 6 \tag{5}$$

The conditional expression (5) specifies a shape factor SF12n of the meniscus lens of the second lens sub-unit, provided that the shape factor SF is expressed by:

$$SF = (R2+R1)/(R2-R1) \tag{5a}$$

where R1 denotes the curvature radius of the object side of the lens, and R2 denotes the curvature radius of the image side of the lens. The numeral value range specified by the expression (5) is desirable in order to reduce aberration variations in focusing.

When the shape factor SF21n reaches the lower limit of the conditional expression (5), the lens has such a large difference between the curvature radius R1 of the object side and the curvature radius R2 of the image side that the negative refractive power of the meniscus lens is too high. As a result, the positive refractive power of the second lens sub-unit is too low. This resultantly increases the stroke length of the second lens sub-unit in focusing, and leads to an increase in the size of the optical system.

When the shape factor SF12n reaches the upper limit of the conditional expression (5), the lens has such a small difference between the curvature radius R1 of the object side and the curvature radius R2 of the image side that the refractive power of the meniscus lens is too low. As a result, the stroke length of the second lens sub-unit in focusing can be made short and accordingly the optical system can be reduced in size. On the other hand, however, the aberrations are largely varied in focusing.

It is more preferable to satisfy a range specified by the following expression (5b) in the conditional expression (5):

$$3.30 < SF12n < 5.60 \tag{5b}$$

In addition, the zoom lens of the present invention satisfies the following conditional expression:

$$15.00 < ftele/fwide < 25.00 \tag{6}$$

where fwide denotes a focal length at a wide angle end, and ftele denotes a focal length at a telephoto end.

Figure 1A:
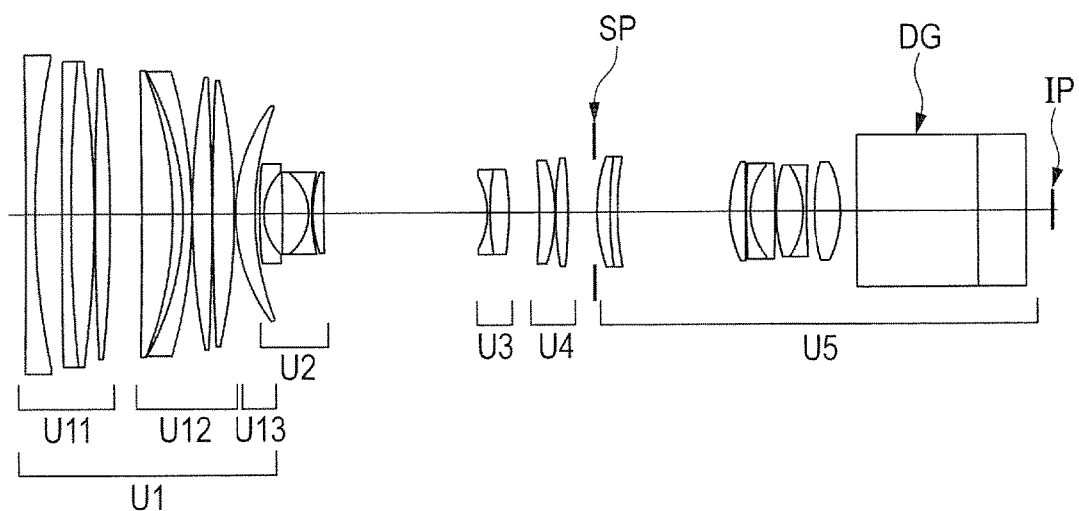
FIG. 1A is a cross sectional lens view of a zoom lens in Example 1 at a wide angle end in focusing to infinity.
Figure 1B:
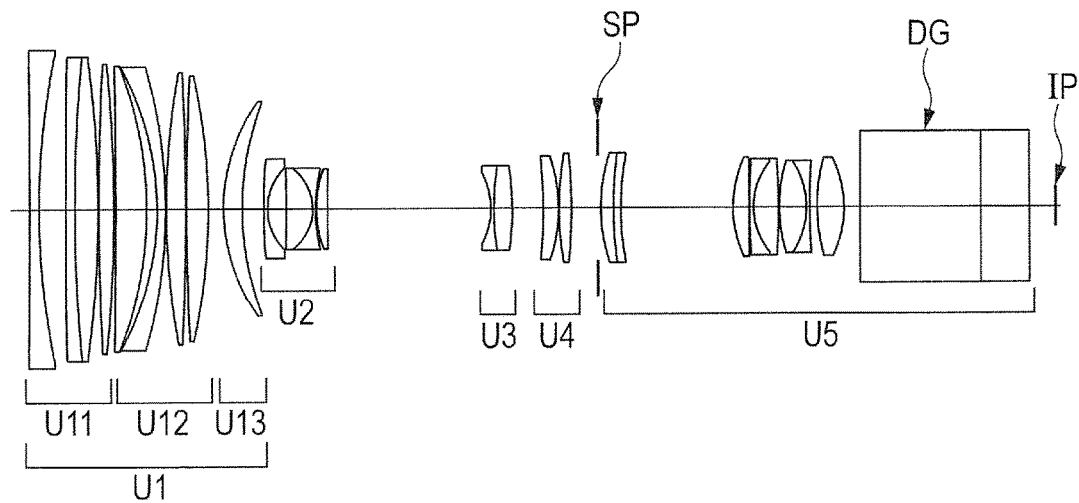
FIG. 1B is a cross sectional lens view of the zoom lens in Example 1 at the wide angle end in focusing to minimum distance (950 mm away from a first surface).
Figure 2C:
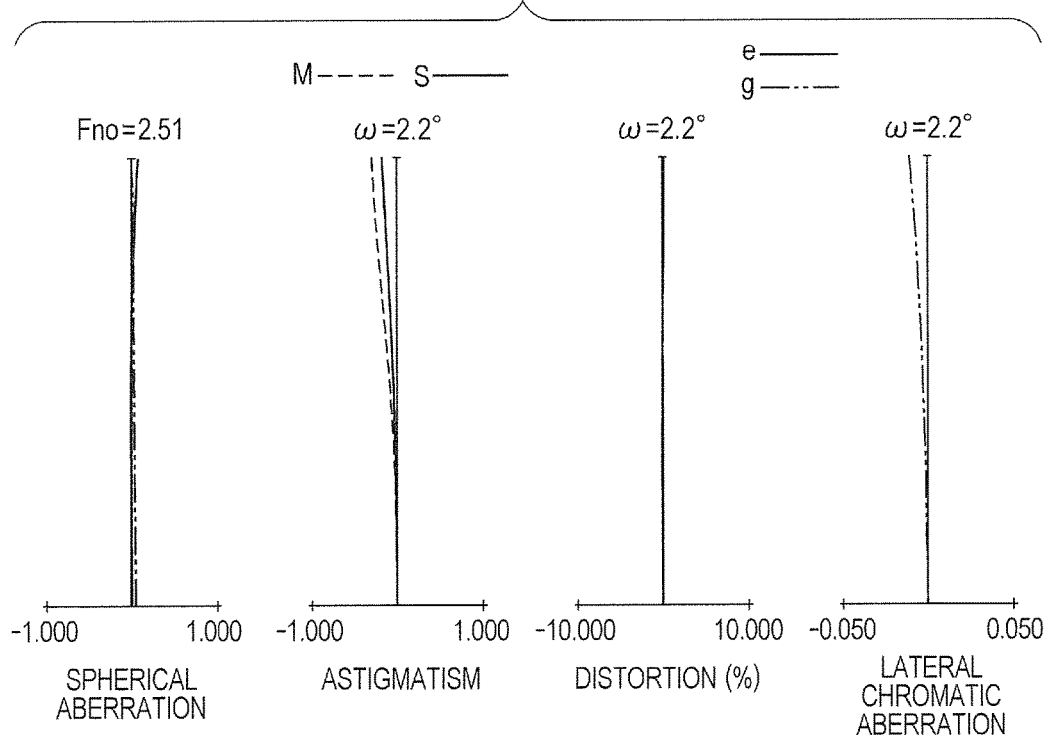
FIG. 2C is an aberration diagram of the zoom lens in Example 1 at a telephoto end in focusing to infinity.
Figure 2D:
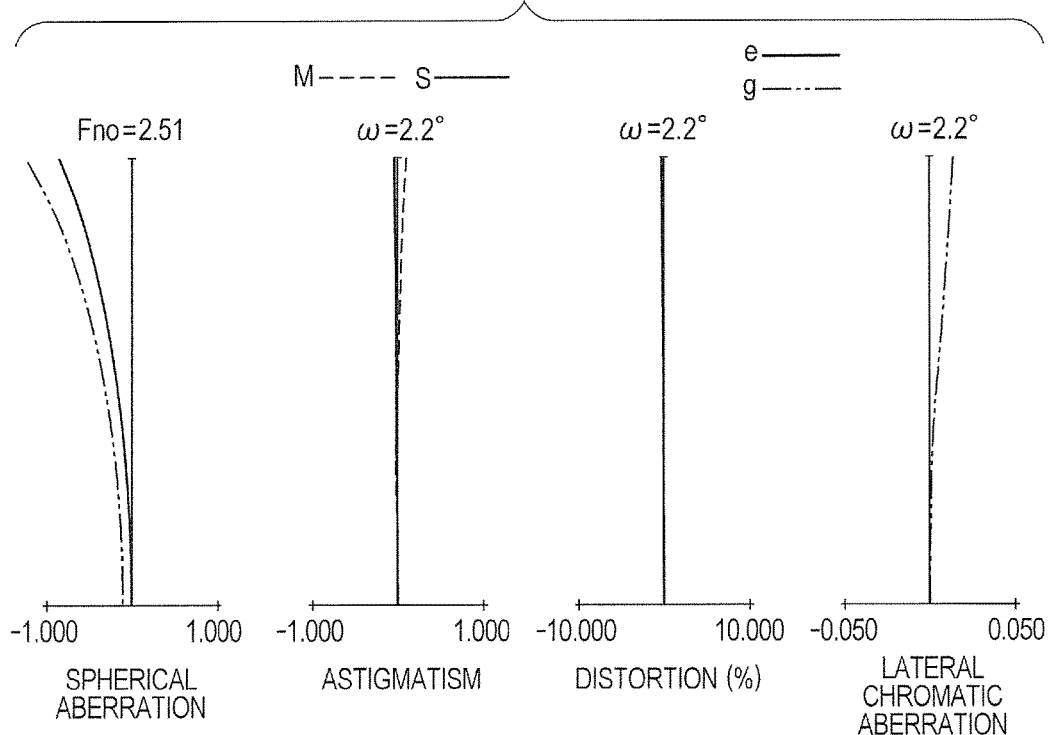
FIG. 2D is an aberration diagram of the zoom lens in Example 1 at the telephoto end in focusing to minimum distance (950 mm away from the first surface).
Figure 3A:
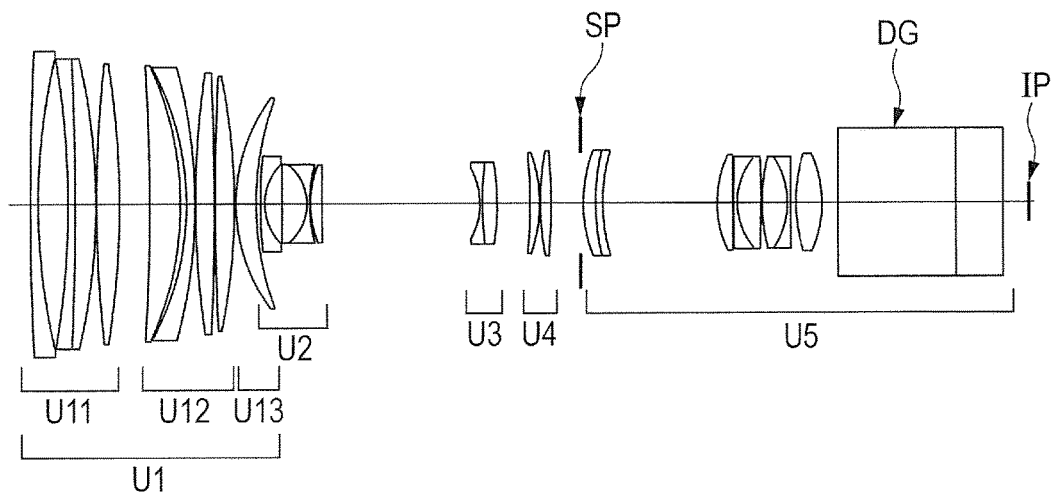
FIG. 3A is a cross sectional lens view of a zoom lens in Example 2 at the wide angle end in focusing to infinity.
Figure 3B:
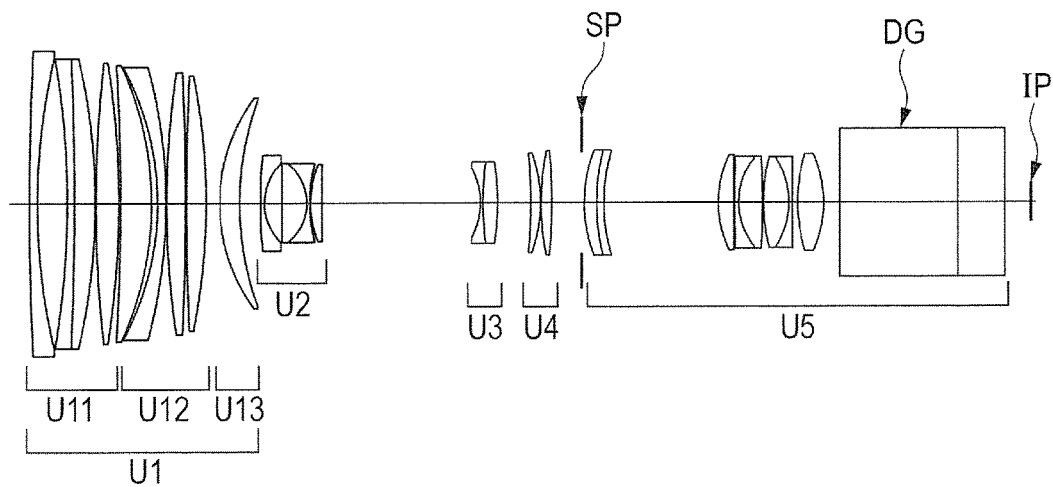
FIG. 3B is a cross sectional lens view of the zoom lens in Example 2 at the wide angle end in focusing to minimum distance (950 mm away from the first surface).
Figure 4A:
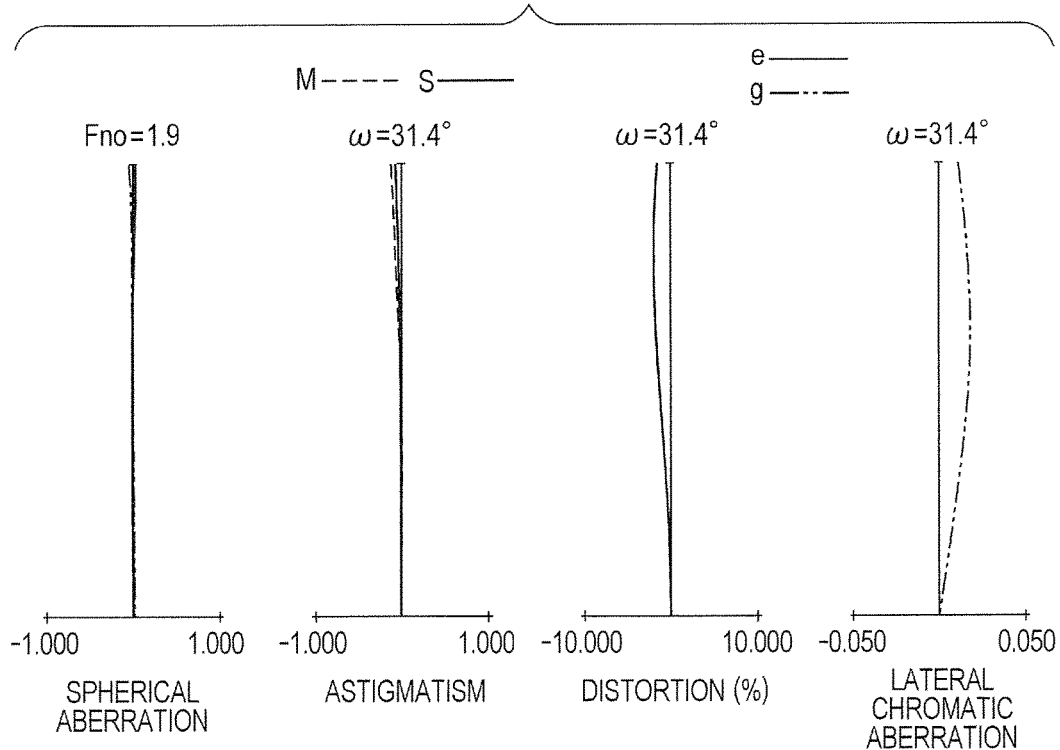
FIG. 4A is an aberration diagram of the zoom lens in Example 2 at the wide angle end in focusing to infinity.
Figure 4B:
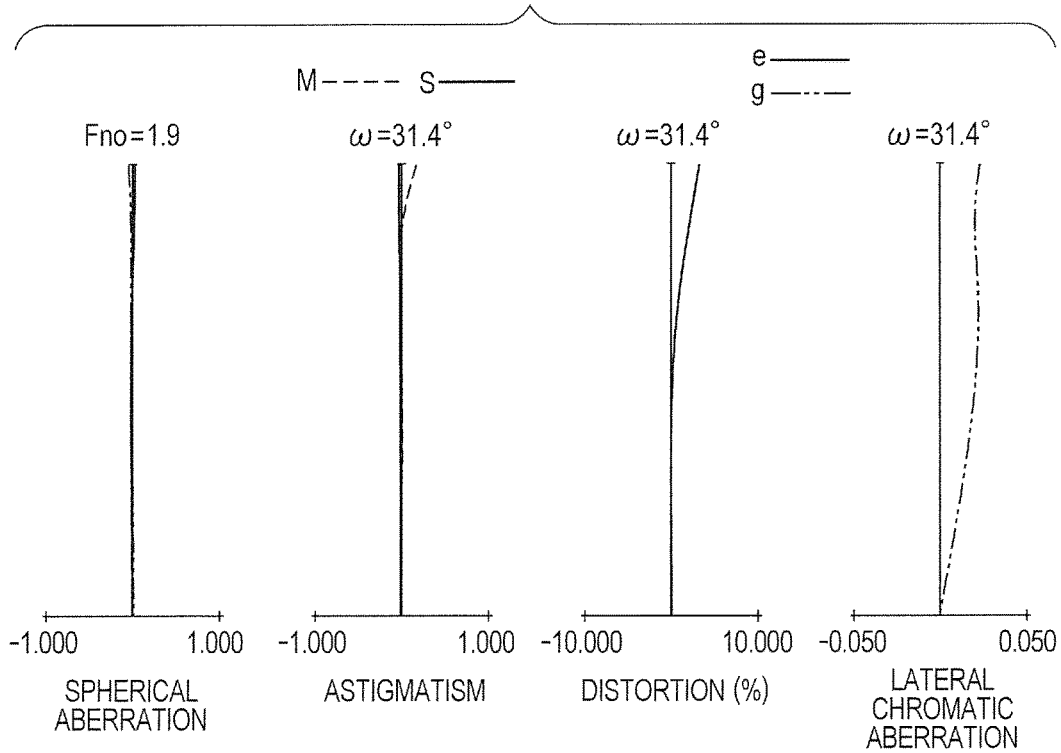
FIG. 4B is an aberration diagram of the zoom lens in Example 2 at the wide angle end in focusing to minimum distance (950 mm away from the first surface).
Figure 4C:
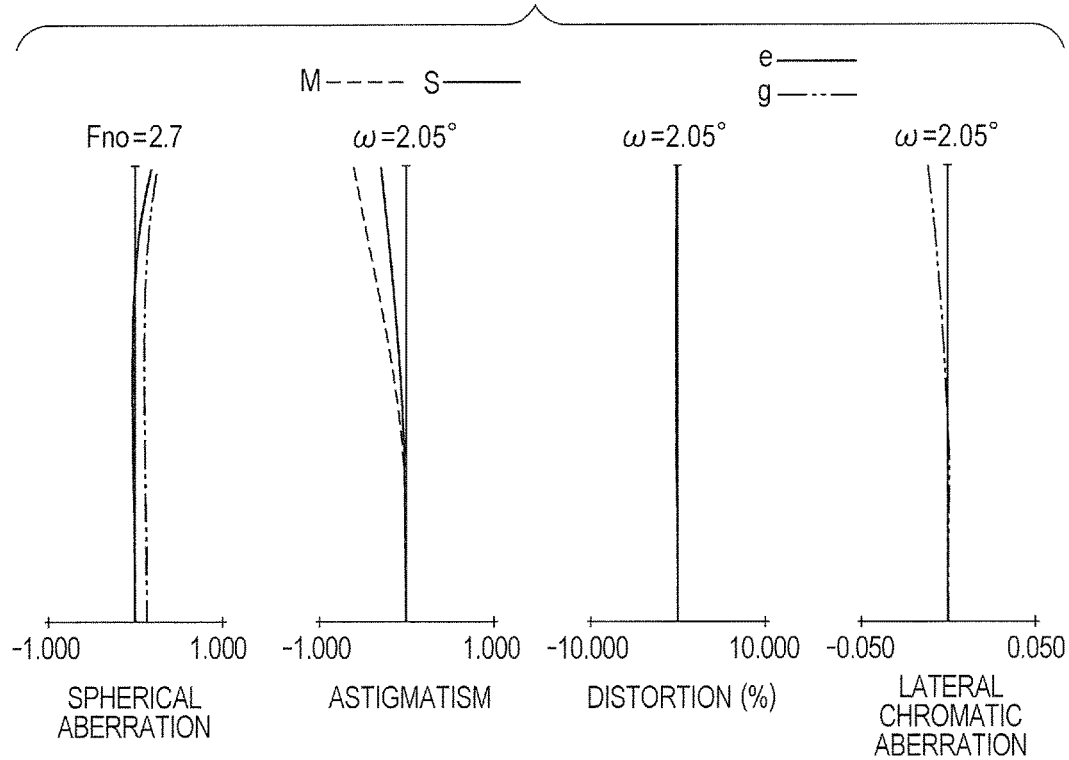
FIG. 4C is an aberration diagram of the zoom lens in Example 2 at the telephoto end in focusing to infinity.
Figure 4D:
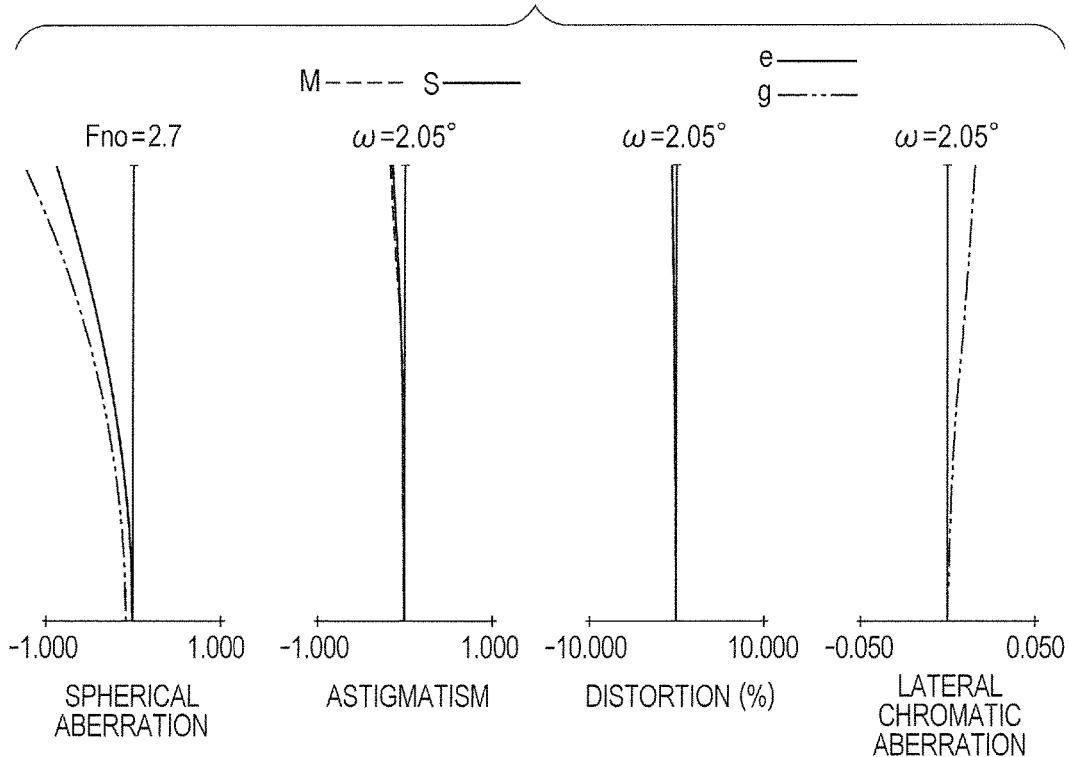
FIG. 4D is an aberration diagram of the zoom lens in Example 2 at the telephoto end in focusing to minimum distance (950 mm away from the first surface).
Figure 5A:
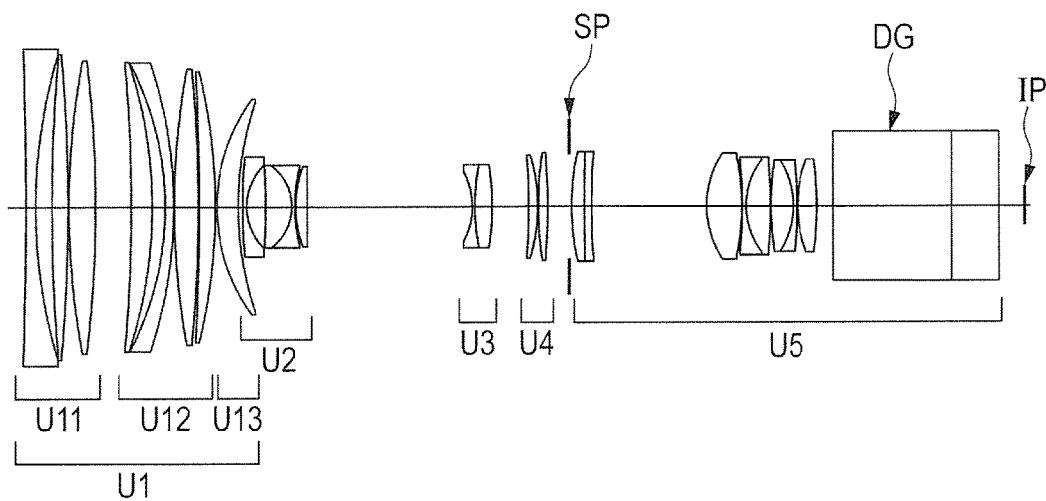
FIG. 5A is a cross sectional lens view of a zoom lens in Example 3 at the wide angle end in focusing to infinity.
Figure 5B:
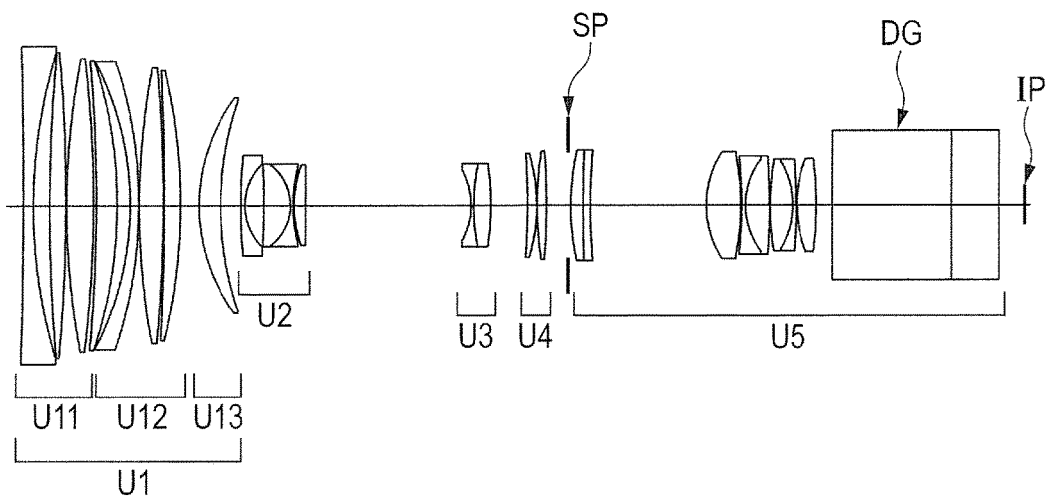
FIG. 5B is a cross sectional lens view of the zoom lens in Example 3 at the wide angle end in focusing to minimum distance (950 mm away from the first surface).
Figure 6A:
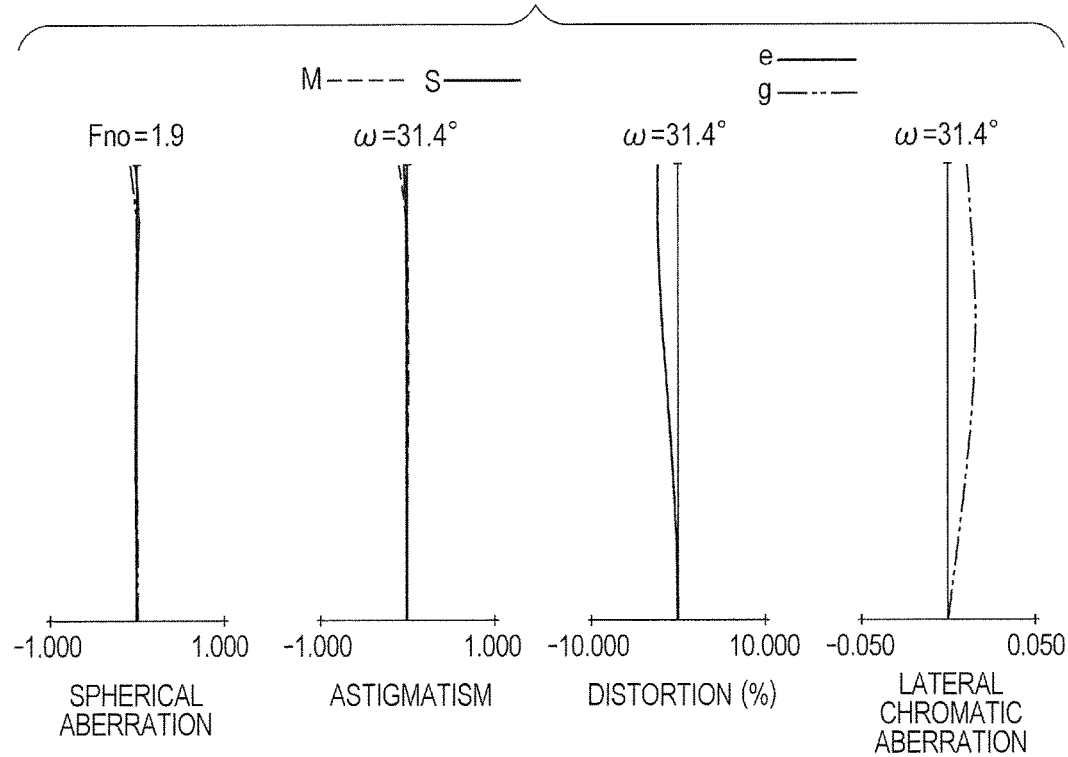
FIG. 6A is an aberration diagram of the zoom lens in Example 3 at the wide angle end in focusing to infinity.
Figure 6B:
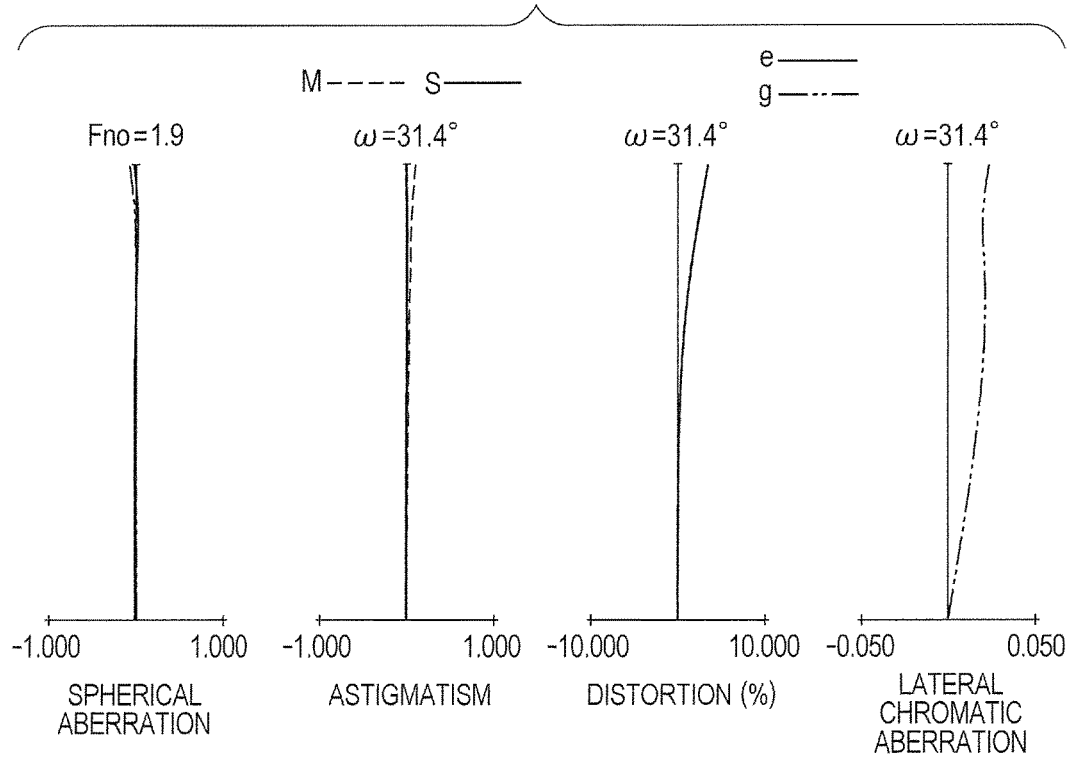
FIG. 6B is an aberration diagram of the zoom lens in Example 3 at the wide angle end in focusing to minimum distance (950 mm away from the first surface).
Figure 6C:
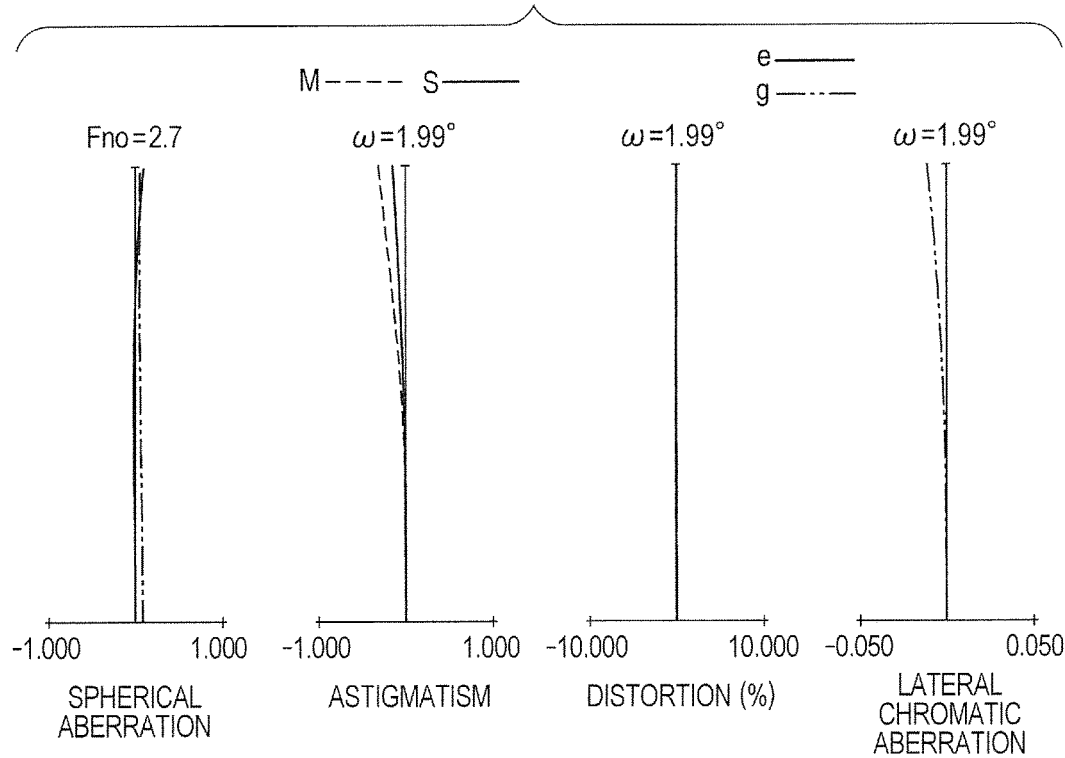
FIG. 6C is an aberration diagram of the zoom lens in Example 3 at the telephoto end in focusing to infinity.
Figure 6D:
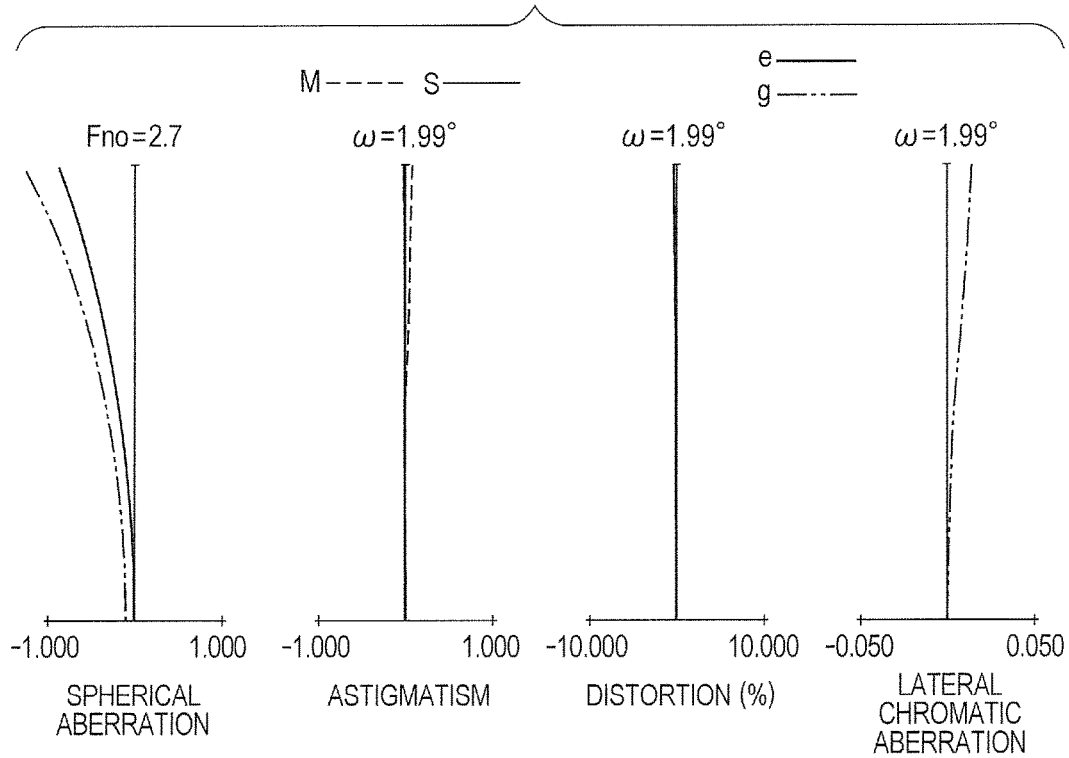
FIG. 6D is an aberration diagram of the zoom lens in Example 3 at the telephoto end in focusing to minimum distance (950 mm away from the first surface).
Figure 7A:
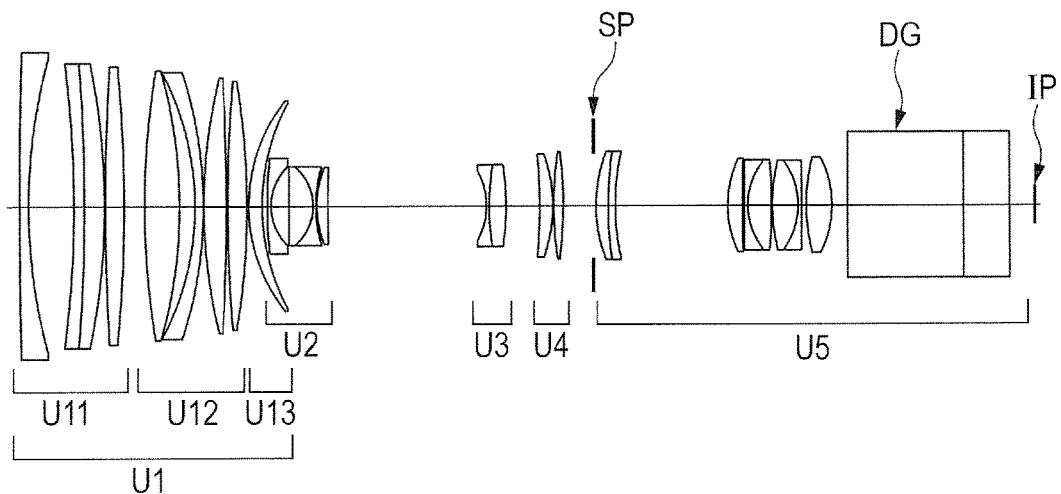
FIG. 7A is a cross sectional lens view of a zoom lens in Example 4 at the wide angle end in focusing to infinity.
Figure 7B:
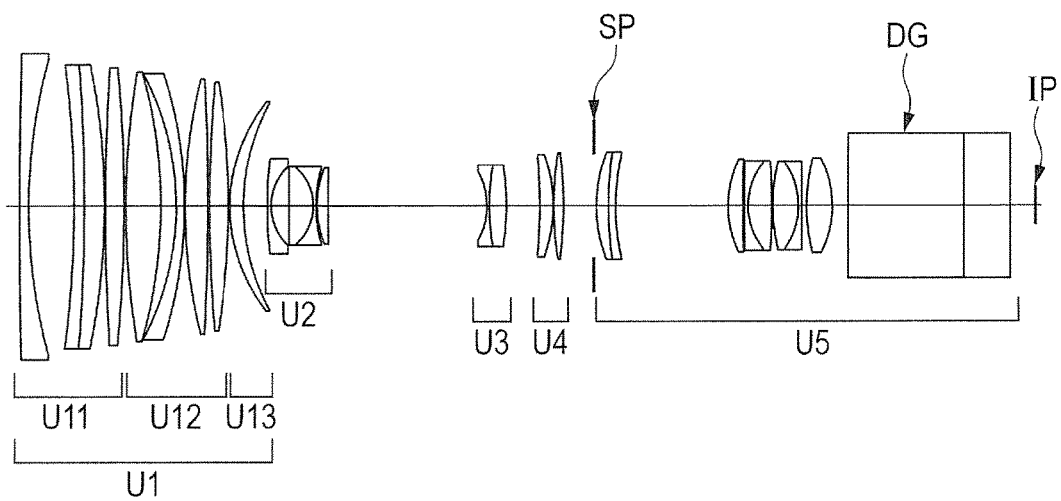
FIG. 7B is a cross sectional lens view of the zoom lens in Example 4 at the wide angle end in focusing to minimum distance (950 mm away from the first surface).
Figure 8A:
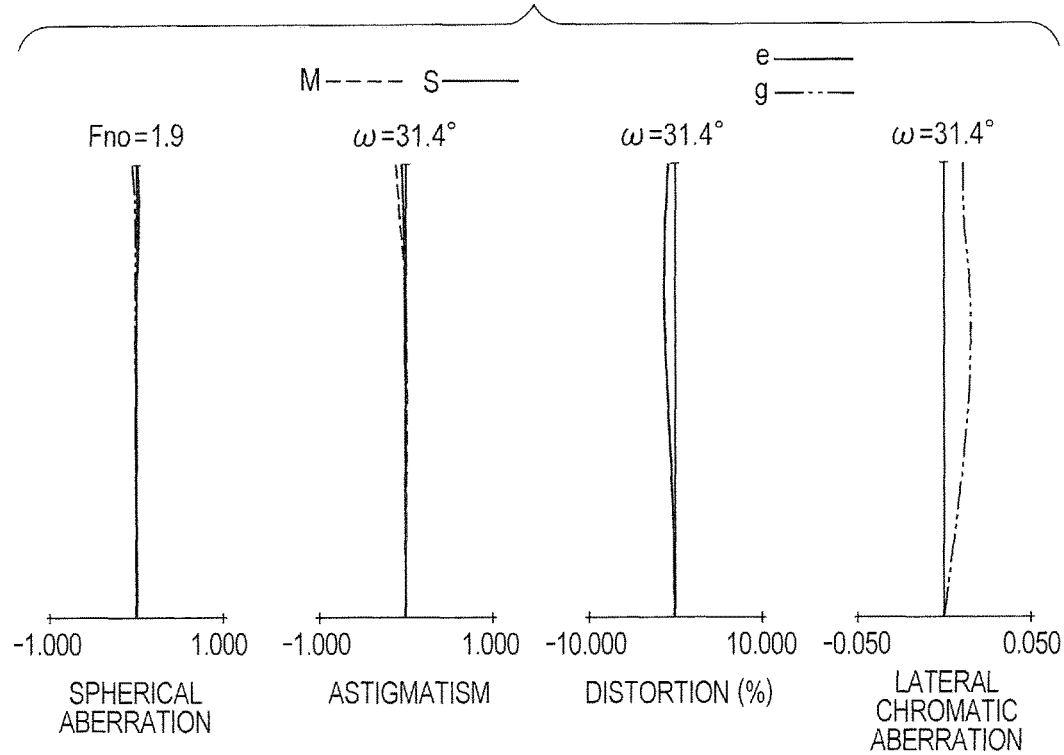
FIG. 8A is an aberration diagram of the zoom lens in Example 4 at the wide angle end in focusing to infinity.
Figure 8B:
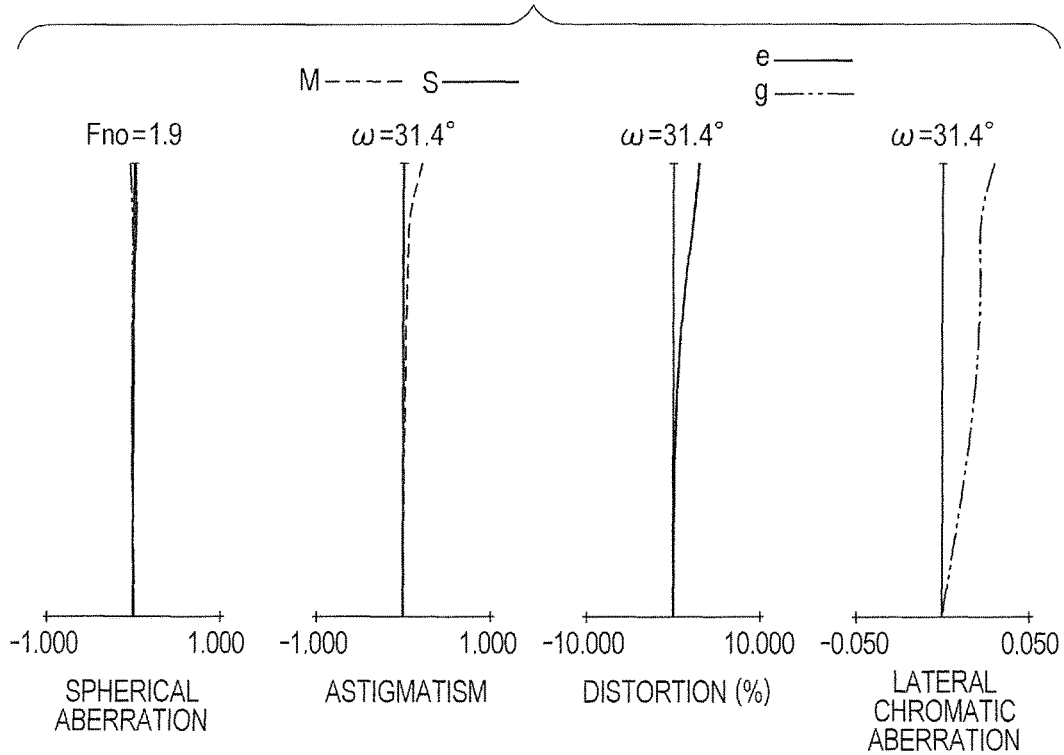
FIG. 8B is an aberration diagram of the zoom lens in Example 4 at the wide angle end in focusing to minimum distance (950 mm away from the first surface).
Figure 8C:
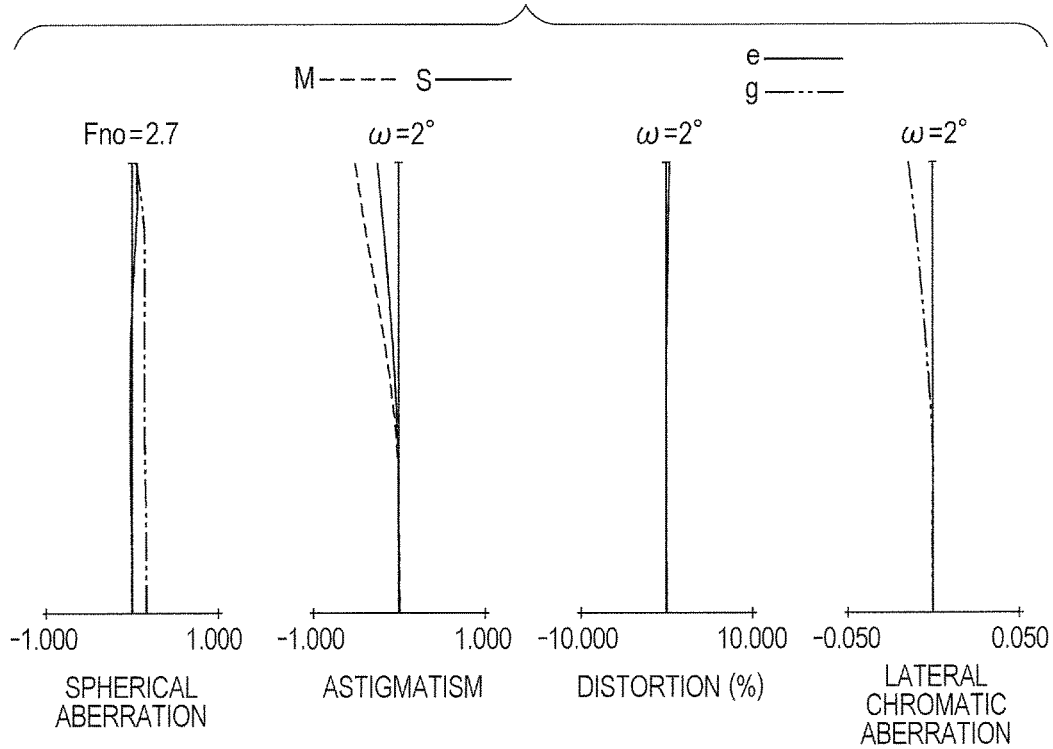
FIG. 8C is an aberration diagram of the zoom lens in Example 4 at the telephoto end in focusing to infinity.
Figure 8D:
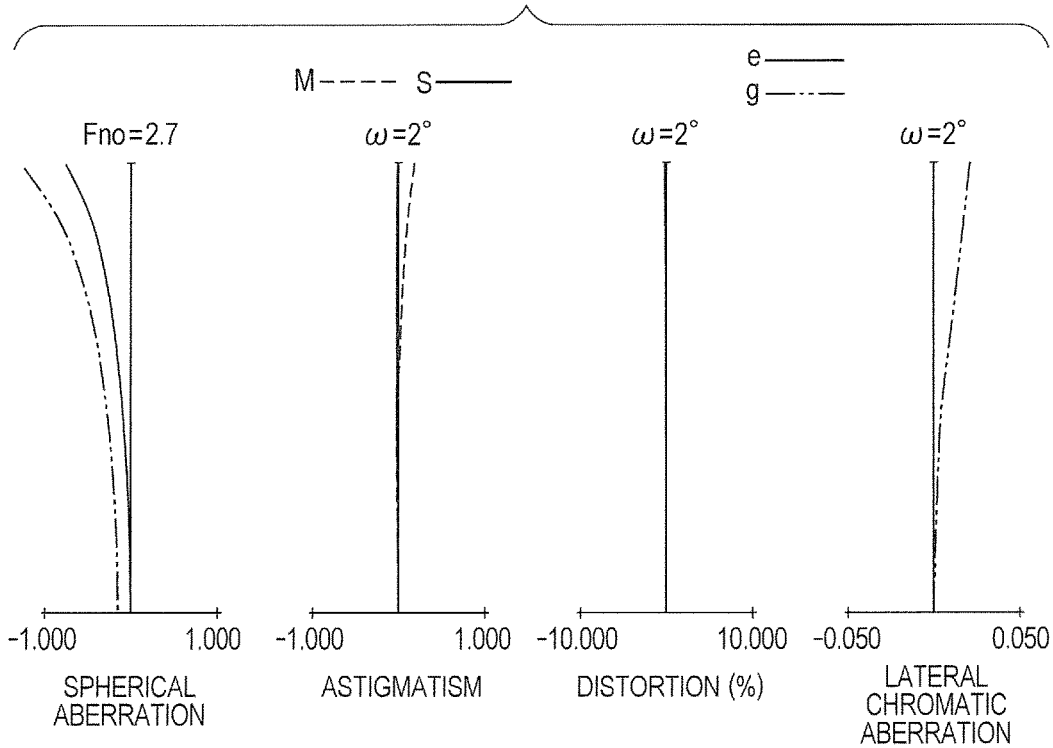
FIG. 8D is an aberration diagram of the zoom lens in Example 4 at the telephoto end in focusing to minimum distance (950 mm away from the first surface).
Figure 9A:
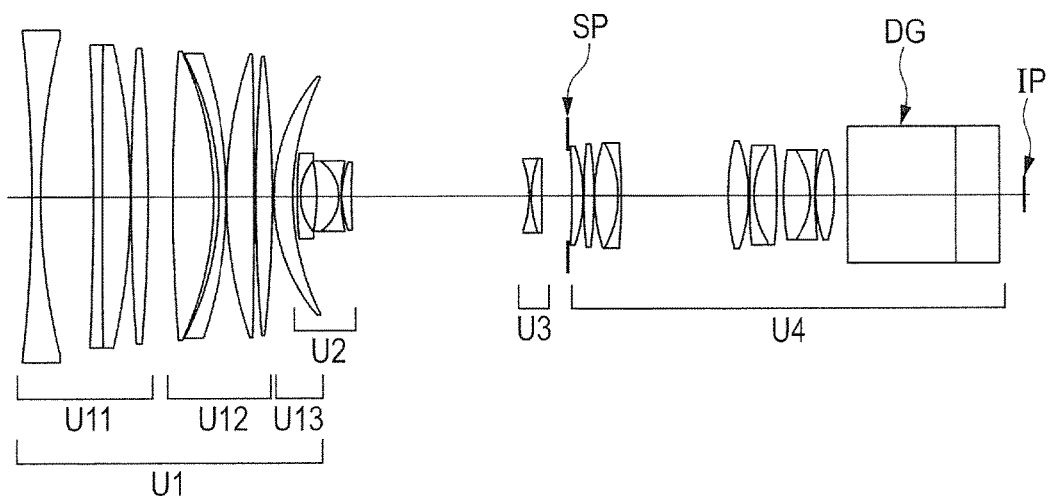
FIG. 9A is a cross sectional lens view of a zoom lens in Example 5 at the wide angle end in focusing to infinity.
Figure 9B:
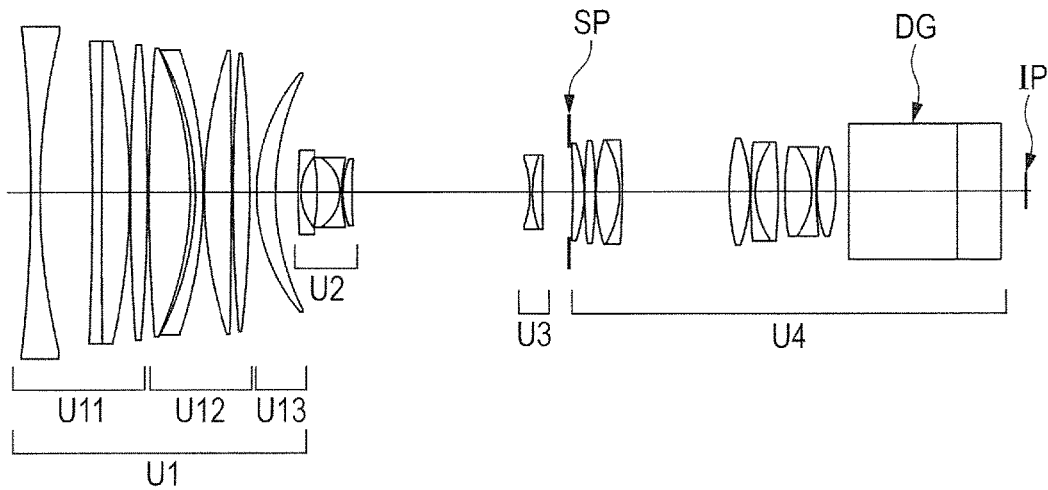
FIG. 9B is a cross sectional lens view of the zoom lens in Example 5 at the wide angle end in focusing to minimum distance (950 mm away from the first surface).
Figure 10A:
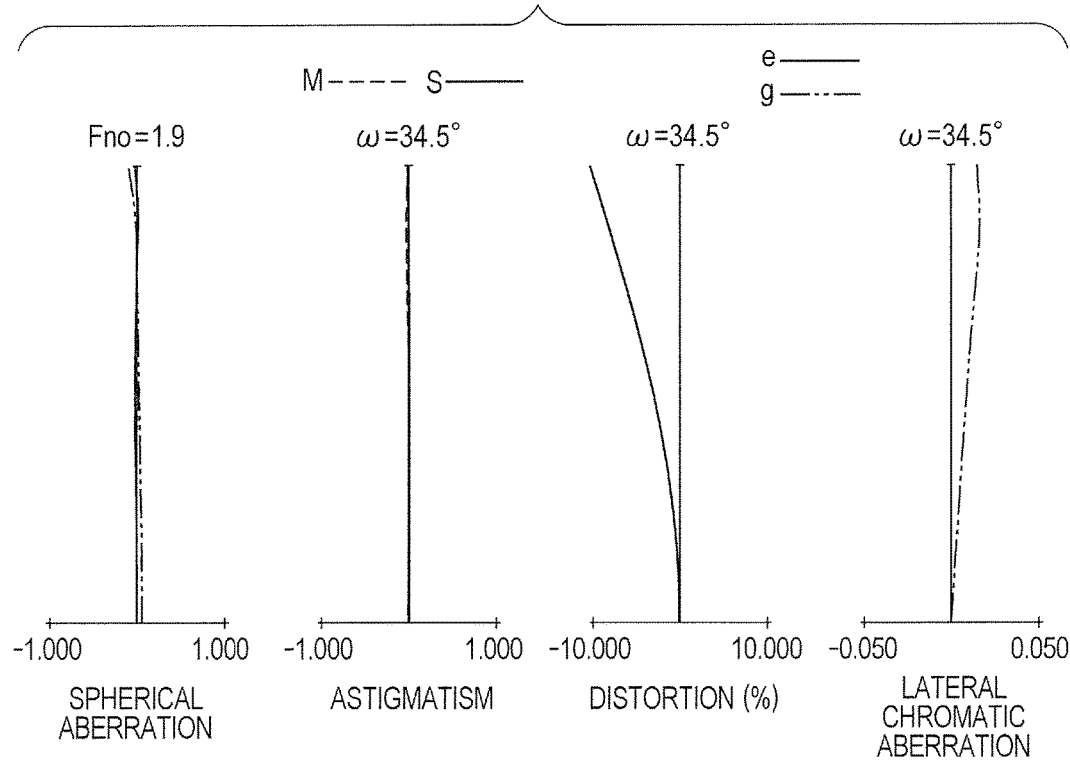
FIG. 10A is an aberration diagram of the zoom lens in Example 5 at the wide angle end in focusing to infinity.
Figure 10B:
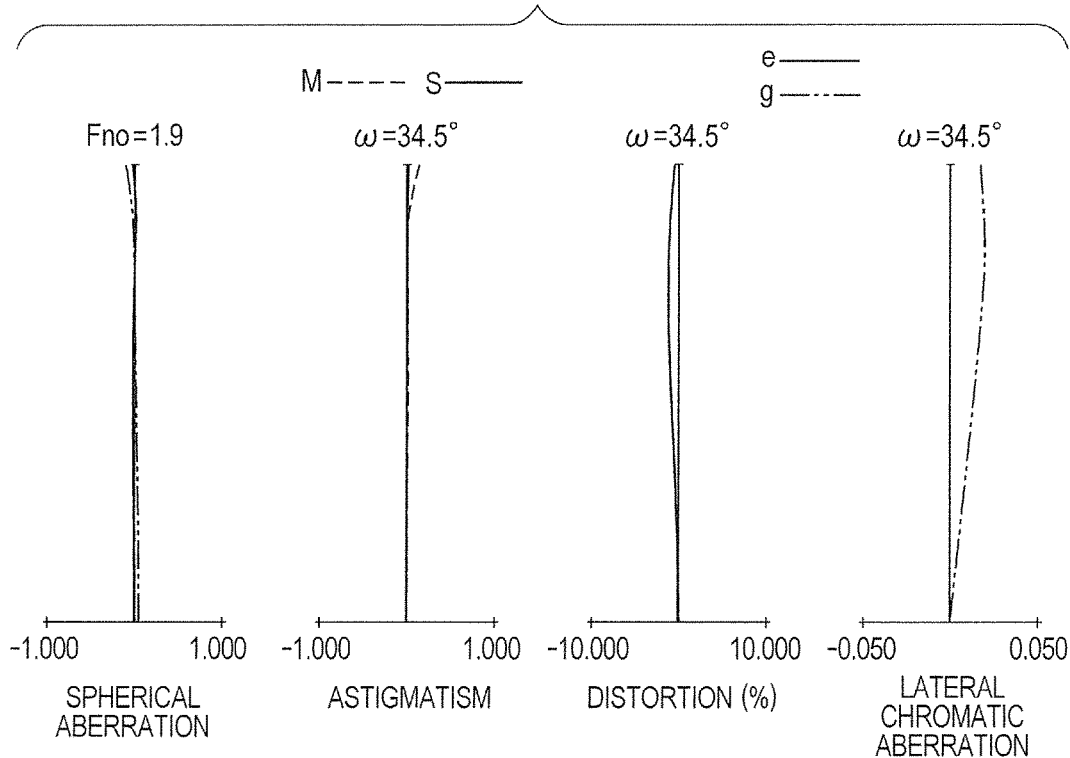
FIG. 10B is an aberration diagram of the zoom lens in Example 5 at the wide angle end in focusing to minimum distance (950 mm away from the first surface).
Figure 10C:
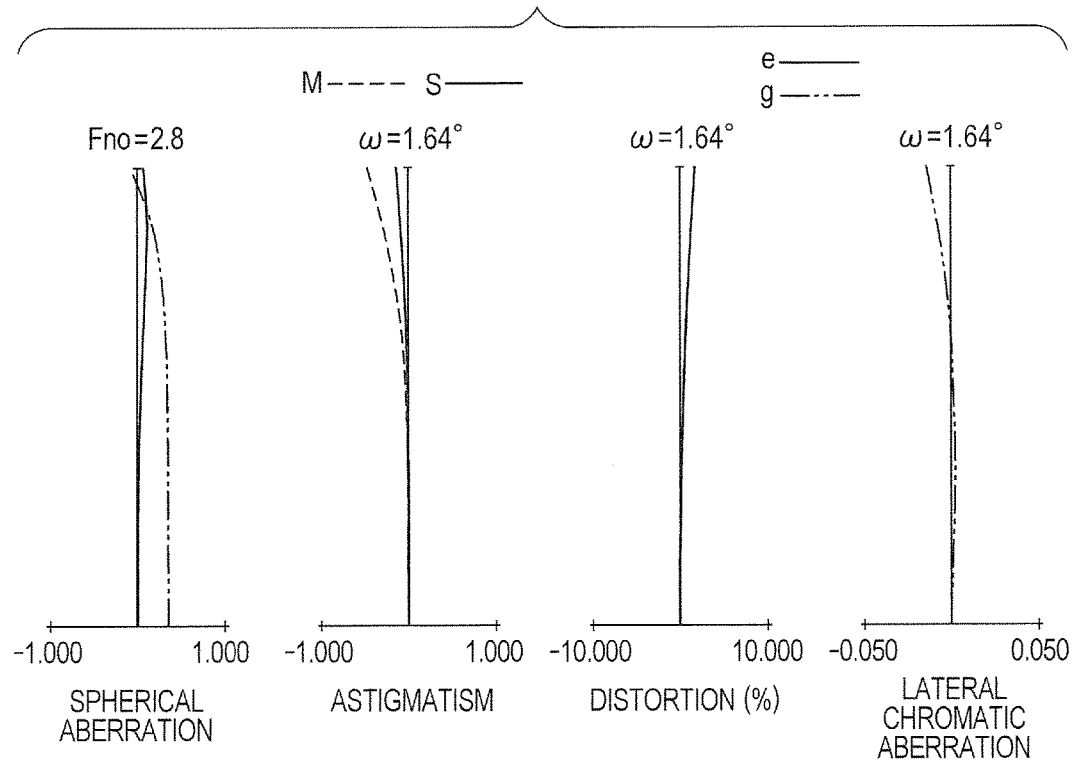
FIG. 10C is an aberration diagram of the zoom lens in Example 5 at the telephoto end in focusing to infinity.
Figure 10D:
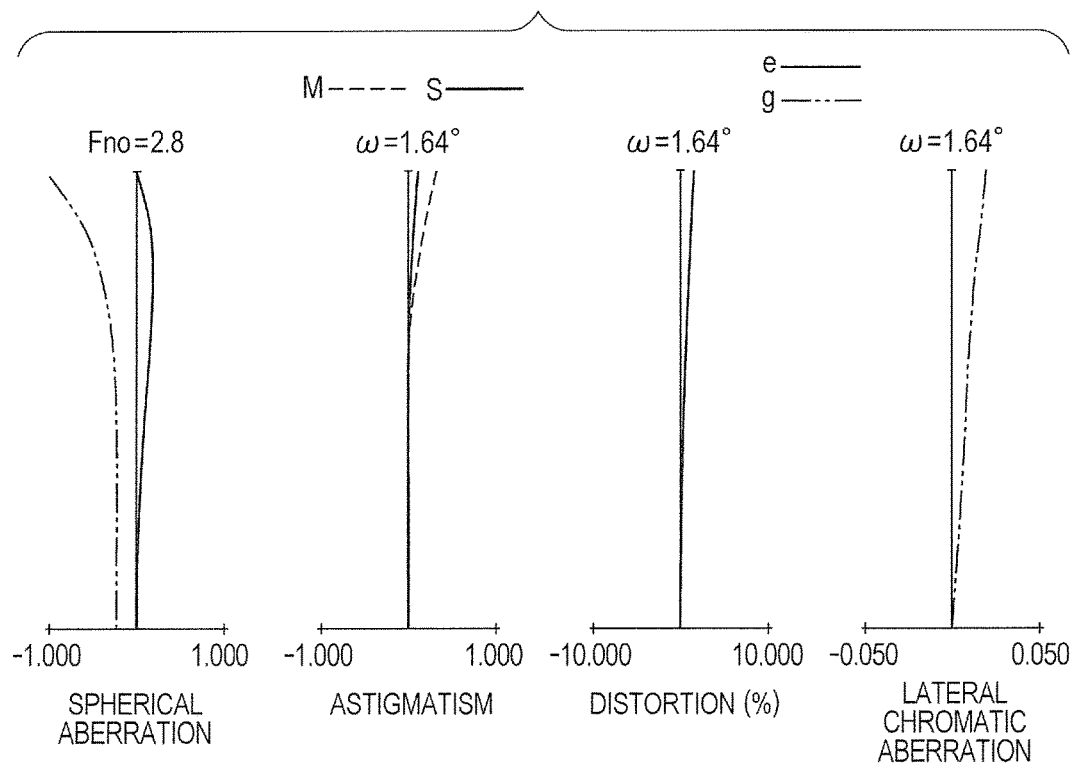
FIG. 10D is an aberration diagram of the zoom lens in Example 5 at the telephoto end in focusing to minimum distance (950 mm away from the first surface).

FIGS. 1A and 1B are cross sectional lens views of a numerical value example 1 as Example 1 of the present invention, at a wide angle end (short focal length end) in focusing to an object at infinite distance and to an object at minimum distance, respectively. FIGS. 2A, 2B, 2C, and 2D are aberration diagrams, respectively, at the wide angle end in focusing to infinity, at the wide angle end in focusing to minimum distance (950 mm away from the first surface), at the telephoto end in focusing to infinity, and at the telephoto end in focusing to minimum distance (950 mm away from the first surface).

In each of the cross sectional lens views, the left side is the subject (object) side (front side), and the right side is the image side (rear side). Reference symbol U1 is a first lens unit having a positive refractive power and being fixed all the time. Reference symbol U2 is a second lens unit during zooming, which is moved on the optical axis toward the image plane side to perform zooming from the wide angle end to the telephoto end. Reference symbols U3 and U4 are a third lens unit and a fourth lens unit both for zooming, which are moved on the optical axis from the wide angle end to the telephoto end. Reference symbol SP is an aperture stop fixed all the time, and U5 is a fifth lens unit (relay lens unit) having an image formation effect. A converter (extender) or the like for focal length conversion may be mounted inside the fifth lens unit. In addition, the fifth lens unit and a following unit may be moved during zooming, image stabilization, and the like, or the fifth lens unit may include multiple lens sub-units. Reference symbol DG is a color separation prism, an optical filter, or the like, and is depicted as a glass block in the drawing. Reference symbol IP is an image plane, and is equivalent to an image plane of a solid-state image pickup element.

In each of the aberration diagrams, a solid line and a broken line of the spherical aberration are the e-line and the g-line, respectively. A solid line and a broken line of the astigmatism are a sagittal image surface (ΔS) and a meridional image surface (ΔM), respectively, and a lateral chromatic aberration is represented by the g-line. The astigmatism and the lateral chromatic aberration represent aberration amounts, provided that a light ray passing through the center of light rays at the position of the stop is set as the principal ray. Then, ω denotes a half angle of view of paraxial rays, and Fno denotes an F-number. In the following Examples, the wide angle end and the telephoto end refer to zooming positions where the lens units for zooming are positioned, respectively, at one end and the other end of a mechanically movable range on the optical axis.

According to the present invention, it is possible to obtain a zoom lens and an image pickup apparatus including the zoom lens, the zoom lens provided with a first lens unit in which a power arrangement and a lens configuration are appropriately set such that the zoom lens can reduce variations of aberrations due to zooming and focusing, and achieve a reduction in size.

EXAMPLE 1

A zoom lens of Example 1 includes in order from the object side to the image side, a first lens unit U1 having a positive refractive power, a second lens unit U2 having a negative refractive power, third and fourth lens units U3 and U4 (zooming lens units), a stop SP, and a fifth lens unit (fixed lens unit) U5 having a positive refractive power. The first lens unit U1 and the fifth lens unit U5 are not moved for zooming. The second lens unit U2, the third lens unit U3, and the fourth lens unit U4 are moved during zooming.

In Example 1 as the numerical value example 1, description is provided for the first lens unit U1, a first lens sub-unit U11, a second lens sub-unit U12, and a third lens sub-unit U13.

The first lens unit U1 covers first to 17th lens surfaces in the numerical value example 1.

The first lens sub-unit U11 covers the first to seventh lens surfaces in the numerical value example 1, and includes a negative lens, a cemented lens including a negative lens and a positive lens arranged in this order and cemented together, and a positive lens, which are arranged in this order from the object side. The first lens sub-unit U11 is fixed in focusing.

The second lens sub-unit U12 covers the eighth to 15th lens surfaces in the numerical value example 1, and includes in order from the object side to the image side, a positive lens, a negative meniscus lens having a convex surface facing an image side, a positive lens, and a positive lens. The second lens sub-unit U12 is shifted toward the object side in focusing to minimum distance.

The third lens sub-unit U13 covers the 16th and 17th lens surfaces in the numerical value example 1, and includes a positive lens. The third lens sub-unit U13 is shifted toward the object side in focusing to minimum distance.

The second lens sub-unit and the third lens sub-unit are moved along different loci in focusing to an object at short distance from an object at infinite distance. Table 1 presents the values of the conditional expressions obtained from Example 1. The present numerical value example 1 satisfies the conditional expressions (1) to (6), and achieves good optical performance.

EXAMPLE 2

A zoom lens in Example 2 includes in order from the object side to the image side, a first lens unit U1 having a positive refractive power, a second lens unit U2 having a negative refractive power, third and fourth lens units U3 and U4 (zooming lens units), a stop SP, and a fifth lens unit (fixed lens unit) U5 having a positive refractive power. The first lens unit U1 and the fifth lens unit U5 are not moved for zooming. The second lens unit U2, the third lens unit U3, and the fourth lens unit U4 are moved during zooming.

In Example 2 as the numerical value example 2, description is provided for the first lens unit U1, a first lens sub-unit U11, a second lens sub-unit U12, and a third lens sub-unit U13.

The first lens unit U1 covers first to 17th lens surfaces in the numerical value example 2.

The first lens sub-unit U11 covers the first to seventh lens surfaces in the numerical value example 2, and includes in order from the object side to the image side, a negative lens, a cemented lens including a negative lens and a positive lens arranged in this order and cemented together, and a positive lens. The first lens sub-unit U11 is fixed in focusing.

The second lens sub-unit U12 covers the eighth to 15th lens surfaces in the numerical value example 2, and includes in order from the object side to the image side, a positive lens, a negative meniscus lens having a convex surface facing an image side, a positive lens, and a positive lens. The second lens sub-unit U12 is shifted toward the object side in focusing to minimum distance.

The third lens sub-unit U13 covers the 16th and 17th lens surfaces in the numerical value example 2, and includes a positive lens. The third lens sub-unit U13 is shifted toward the object side in focusing to minimum distance.

The second lens sub-unit and the third lens sub-unit are moved along different loci in focusing to an object at short distance from an object at infinite distance. Table 1 presents the values of the conditional expressions obtained from Example 2. The present numerical value example 2 satisfies the conditional expressions (1) to (6), and achieves good optical performance.

EXAMPLE 3

A zoom lens in Example 3 includes in order from the object side to the image side, a first lens unit U1 having a positive refractive power, a second lens unit U2 having a negative refractive power, third and fourth lens units U3 and U4 (zooming lens units), a stop SP, and a fifth lens unit (fixed lens unit) U5 having a positive refractive power. The first lens unit U1 and the fifth lens unit U5 are not moved for zooming. The second lens unit U2, the third lens unit U3, and the fourth lens unit U4 are moved during zooming.

In Example 3 as the numerical value example 3, description is provided for the first lens unit U1, a first lens sub-unit U11, a second lens sub-unit U12, and a third lens sub-unit U13.

The first lens unit U1 covers first to 16th lens surfaces in the numerical value example 3.

The first lens sub-unit U11 covers the first to sixth lens surfaces in the numerical value example 3, and includes in order from the object side to the image side, a negative lens, a positive lens, and a positive lens. The first lens sub-unit U11 is fixed in focusing.

The second lens sub-unit U12 covers the seventh to 14th lens surfaces in the numerical value example 3' and includes in order from the object side to the image side, a positive lens, a negative meniscus lens having a convex surface facing an image side, a positive lens, and a positive lens. The second lens sub-unit U12 is shifted toward the object side in focusing to minimum distance.

The third lens sub-unit U13 covers the 15th and 16th lens surfaces in the numerical value example 3, and includes a positive lens. The third lens sub-unit U13 is shifted toward the object side in focusing to minimum distance. The second lens sub-unit and the third lens sub-unit are moved along different loci in focusing to an object at short distance from an object at infinite distance.

Table 1 presents the values of the conditional expressions obtained from Example 3. The present numerical value example 3 satisfies the conditional expressions (1) to (6), and achieves good optical performance.

EXAMPLE 4

A zoom lens in Example 4 includes in order from the object side to the image side, a first lens unit U1 having a positive refractive power, a second lens unit U2 having a negative refractive power, third and fourth lens units U3 and U4 (zooming lens units), a stop SP, and a fifth lens unit (fixed lens unit) U5 having a positive refractive power. The first lens unit U1 and the fifth lens unit U5 are not moved for zooming. The second lens unit U2, the third lens unit U3, and the fourth lens unit U4 are moved during zooming.

In Example 4 as the numerical value example 4, description is provided for the first lens unit U1, a first lens sub-unit U11, a second lens sub-unit U12, and a third lens sub-unit U13.

The first lens unit U1 covers first to 17th lens surfaces in the numerical value example 4.

The first lens sub-unit U11 covers the first to seventh lens surfaces in the numerical value example 4, and includes in order from the object side to the image side, a negative lens, a cemented lens including a negative lens and a positive lens arranged in this order and cemented together, and a positive lens. The first lens sub-unit U11 is fixed in focusing.

The second lens sub-unit U12 covers the eighth to 15th lens surfaces in the numerical value example 4, and includes in order from the object side to the image side, a positive lens, a negative meniscus lens having a convex surface facing the image side, a positive lens, and a positive lens. The second lens sub-unit U12 is shifted toward the object side in focusing to minimum distance.

The third lens sub-unit U13 covers the 16th and 17th lens surfaces in the numerical value example 4, and includes a positive lens. The third lens sub-unit U13 is shifted toward the object side in focusing to minimum distance. The second lens sub-unit and the third lens sub-unit are moved along different loci in focusing to an object at short distance from an object at infinite distance.

Table 1 presents the values of the conditional expressions obtained from Example 4. The present numerical value example 4 satisfies the conditional expressions (1) to (6), and achieves good optical performance.

EXAMPLE 5

A zoom lens in Example 5 includes in order from the object side to the image side, a first lens unit U1 having a positive refractive power, a second lens unit U2 having a negative refractive power, a third lens unit U3 (zooming lens unit), a stop SP, and a fourth lens unit (fixed lens unit) U4 having a positive refractive power. The first lens unit U1 and the fourth lens unit U4 are not moved for zooming. The second lens unit U2 and the third lens unit U3 are moved during zooming.

In Example 5 as the numerical value example 5, description is provided for the first lens unit U1, a first lens sub-unit U11, a second lens sub-unit U12, and a third lens sub-unit U13.

The first lens unit U1 covers first to 17th lens surfaces in the numerical value example 5.

The first lens sub-unit U11 covers the first to seventh lens surfaces in the numerical value example 5, and includes in order from the object side to the image side, a negative lens, a cemented lens including a negative lens and a positive lens arranged in this order and cemented together, and a positive lens. The first lens sub-unit U11 is fixed in focusing.

The second lens sub-unit U12 covers the eighth to 15th lens surfaces in the numerical value example 5, and includes in order from the object side to the image side, a positive lens, a negative meniscus lens having a convex surface facing an image side, a positive lens, and a positive lens. The second lens sub-unit U12 is shifted toward the object side in focusing to minimum distance.

The third lens sub-unit U13 covers the 16th and 17th lens surfaces in the numerical value example 5, and includes a positive lens. The third lens sub-unit U13 is shifted toward the object side in focusing to minimum distance. The second lens sub-unit and the third lens sub-unit are moved along different loci in focusing to an object at short distance from an object at infinite distance.

Table 1 presents the values of the conditional expressions obtained from Example 5. The present numerical value example 5 satisfies the conditional expressions (1) to (6), and achieves good optical performance.

Figure 11:
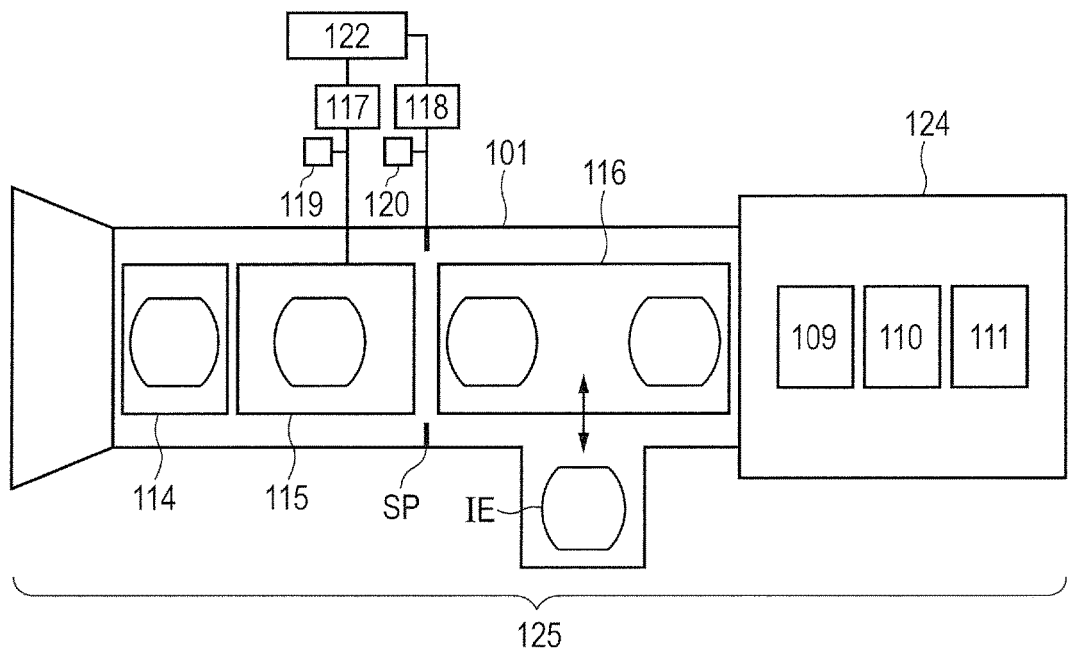
FIG. 11 is a schematic diagram of essential parts of an image pickup apparatus (television camera system) using any one of the zoom lenses of Examples as an image-shooting optical system.

Next, description is provided for an image pickup apparatus using each of the zoom lenses described above as an image-shooting optical system. FIG. 11 is a schematic diagram of essential parts of an image pickup apparatus (television camera system) using any one of the zoom lenses of Examples as an image-shooting optical system. In FIG. 11, reference sign 101 is any one of the zoom lenses of Examples 1 to 5.

Reference symbol 124 is a camera. The zoom lens 101 is detachably attachable to the camera 124. Reference sign 125 is an image pickup apparatus formed by attaching the zoom lens 101 to the camera 124. The zoom lens 101 includes a first lens unit 114, a zooming unit (also serving as a focusing unit) 115 including second and third lens units that are moved in zooming, and a fourth lens unit that is moved in zooming and focusing, and a fifth lens unit 116 for image formation. Reference symbol SP is an aperture stop. The fifth lens unit 116 that is fixed in zooming and focusing includes a zooming optical system IE that can be inserted into and retracted from an optical path.

The zooming unit 115 is provided with a drive mechanism such that the zooming unit 115 can be driven in optical axis directions. Reference symbols 117 and 118 are drivers, such as motors, that electrically drive the zooming unit 115 and the aperture stop SP, respectively. Reference signs 119 and 120 are detectors, such as an encoder, a potentiometer, and a photo sensor, for detecting the positions of the lens units in the zooming unit 115 on the optical axis, and detecting the aperture diameter of the aperture stop SP. Here, the drive locus of each lens unit in the zooming unit 115 may be any of a mechanical locus caused by a helicoid, a cam, or the like, and an electrical locus caused by an ultrasonic wave motor or the like. In the camera 124, reference symbol 109 is a glass block equivalent to an optical filter or a color separation prism in the camera 124, and reference symbol 110 is a solid-state image pickup element (photoelectric conversion element), such as a CCD sensor or CMOS sensor, for receiving light of a subject image (optical image) formed by the zoom lens 101. Then, reference symbols 111 and 122 are CPUs for controlling various kinds of driving of the camera 124 and the zoom lens 101, respectively. By applying the zoom lens of the present invention to the television camera as described above, the image pickup apparatus achieving high optical performance is obtained.

Hereinabove, the preferable embodiments of the present invention have been described. It should be noted, however, that the present invention is not limited to these embodiments, but may be modified or altered in various ways without departing from the spirit of the present invention.

Next, the numerical value examples 1 to 5 for Examples 1 to 5 of the present invention are presented. In each of the numerical value examples, i denotes the ordinal number of a surface counted from the object side, ri denotes the curvature radius of an i-th surface from the object side, di denotes a distance between the i-th and i+1-th surfaces from the object side, and ndi and vdi denote a refractive index and an Abbe number of an optical component including the i-th surface, respectively. The last three surfaces are of a glass block such as a filter. The focal length, the F-number, and the half angle of view indicate values in focusing to an object at infinite distance. Then, BF denotes a value of a distance in air from the last surface of the glass block to an image plane.

Table 1 presents correspondences between Examples and the conditional expressions.

Numerical Value Example 1

Unit: mm

Surface Data

| Surface Number i | ri | di | ndi | vdi | Effective Diameter |
|---|---|---|---|---|---|
| 1 | −2676.877 | 2.50 | 1.80518 | 25.4 | 83.56 |
| 2 | 206.698 | 7.23 | | | 81.15 |
| 3 | 2182.115 | 2.50 | 1.80100 | 35.0 | 80.03 |
| 4 | 434.752 | 6.38 | 1.43387 | 95.1 | 79.28 |
| 5 | −298.198 | 0.20 | | | 78.91 |
| 6 | 755.007 | 4.11 | 1.43387 | 95.1 | 77.38 |
| 7 | −386.897 | 8.66 | | | 77.02 |
| 8 | −2043.707 | 8.40 | 1.43387 | 95.1 | 76.12 |
| 9 | −105.255 | 2.79 | | | 75.48 |
| 10 | −80.393 | 2.40 | 1.74950 | 35.3 | 74.96 |
| 11 | −137.961 | 0.15 | | | 74.95 |
| 12 | 205.695 | 5.37 | 1.59522 | 67.7 | 71.14 |
| 13 | −689.638 | 0.20 | | | 70.58 |
| 14 | 763.147 | 5.88 | 1.59522 | 67.7 | 69.14 |
| 15 | −166.515 | 0.47 | | | 68.65 |
| 16 | 49.429 | 5.30 | 1.76385 | 48.5 | 57.10 |
| 17 | 80.503 | (Variable) | | | 55.88 |
| 18* | 250.617 | 1.07 | 2.00330 | 28.3 | 25.88 |
| 19 | 15.777 | 5.11 | | | 21.29 |
| 20 | −337.514 | 7.20 | 1.80809 | 22.8 | 21.04 |
| 21 | −13.903 | 0.81 | 1.88300 | 40.8 | 20.66 |
| 22 | 47.703 | 0.23 | | | 20.37 |
| 23 | 31.306 | 2.98 | 1.76182 | 26.5 | 20.65 |
| 24 | 517.244 | (Variable) | | | 20.48 |
| 25 | −20.456 | 0.75 | 1.75700 | 47.8 | 16.62 |
| 26 | 67.398 | 5.06 | 1.84649 | 23.9 | 18.19 |
| 27 | −77.054 | (Variable) | | | 19.94 |
| 28 | −137.948 | 4.19 | 1.64000 | 60.1 | 25.70 |
| 29 | −44.112 | 0.15 | | | 26.93 |
| 30 | 84.287 | 3.39 | 1.51633 | 64.1 | 28.11 |
| 31 | −149.579 | (Variable) | | | 28.28 |
| 32 (Stop) | ∞ | 0.74 | | | 28.47 |
| 33 | 46.700 | 3.50 | 1.58913 | 61.1 | 28.65 |
| 34 | 106.519 | 2.00 | 1.95375 | 32.3 | 28.22 |
| 35 | 76.620 | 30.67 | | | 27.73 |
| 36 | 32.555 | 4.33 | 1.48749 | 70.2 | 25.70 |
| 37 | −1403.873 | 0.20 | | | 25.18 |
| 38 | 275.626 | 1.00 | 1.88300 | 40.8 | 24.92 |
| 39 | 19.335 | 6.86 | 1.49700 | 81.5 | 23.51 |
| 40 | −216.574 | 0.18 | | | 23.52 |
| 41 | 43.749 | 7.40 | 1.54814 | 45.8 | 23.42 |
| 42 | −22.627 | 1.00 | 1.88300 | 40.8 | 23.09 |
| 43 | 243.930 | 2.12 | | | 23.82 |
| 44 | 49.770 | 7.28 | 1.48749 | 70.2 | 25.21 |
| 45 | −30.568 | 4.50 | | | 25.46 |
| 46 | ∞ | 33.00 | 1.60859 | 46.4 | 40.00 |
| 47 | ∞ | 13.20 | 1.51633 | 64.1 | 40.00 |
| 48 | ∞ | 7.21 | | | 40.00 |
| Image Plane | ∞ | | | | |

Aspheric Surface Data
18th Surface k = 1.70731e+002
A4 = 9.28346e−006
A6 = −1.76629e−008
A8 = 5.54259e−011
A10 = −3.10285e−013
A12 = 7.67821e−016

Various Data
Zoom Ratio 15.92

| | | | | | |
|---|---|---|---|---|---|
| Focal Length | 9.00 | 12.69 | 33.24 | 78.02 | 143.25 |
| F-NUMBER | 1.90 | 1.90 | 1.89 | 1.90 | 2.51 |
| Half Angle of View | 31.43 | 23.43 | 9.39 | 4.03 | 2.20 |
| Image Height | 5.50 | 5.50 | 5.50 | 5.50 | 5.50 |
| Lens Total Length | 280.33 | 280.33 | 280.33 | 280.33 | 280.33 |
| BF | 7.21 | 7.21 | 7.21 | 7.21 | 7.21 |
| d17 | 1.32 | 12.86 | 34.57 | 45.69 | 50.02 |
| d24 | 44.55 | 34.38 | 12.01 | 5.54 | 4.39 |
| d27 | 8.58 | 9.87 | 12.45 | 9.14 | 1.67 |
| d31 | 7.18 | 4.52 | 2.59 | 1.26 | 5.55 |
| d48 | 7.21 | 7.21 | 7.21 | 7.21 | 7.21 |
| Entrance Pupil Position | 61.51 | 84.85 | 189.09 | 379.60 | 596.38 |
| Exit Pupil Position | −14878.91 | −14878.91 | −14878.91 | −14878.91 | −14878.91 |
| Front Side Principal Point Position | 70.50 | 97.53 | 222.26 | 457.21 | 738.25 |
| Rear Side Principal Point Position | −1.79 | −5.48 | −26.04 | −70.81 | −136.04 |

-continued

Unit: mm

Zooming lens unit Data

| Unit | Start Surface | Focal Length | Lens Structure Length | Front Side Principal Point Position | Rear Side Principal Point Position |
|---|---|---|---|---|---|
| 1 | 1 | 68.70 | 62.55 | 41.66 | −0.46 |
| 2 | 18 | −15.70 | 17.40 | 0.77 | −11.16 |
| 3 | 25 | −42.70 | 5.81 | −1.52 | −4.85 |
| 4 | 28 | 50.84 | 7.74 | 3.58 | −1.32 |
| 5 | 32 | 52.44 | 117.99 | 52.26 | −53.18 |

Stroke Length of Focusing Unit in Focusing to Minimum Distance

| Unit | Start Surface | End Surface | Stroke in Focusing |
|---|---|---|---|
| 1 | 8 | 15 | −8.17 |
| 1 | 16 | 17 | −4.50 |

Individual Lens Data

| Lens | Start Surface | Focal Length |
|---|---|---|
| 1 | 1 | −236.03 |
| 2 | 3 | −673.68 |
| 3 | 4 | 407.73 |
| 4 | 6 | 588.76 |
| 5 | 8 | 254.79 |
| 6 | 10 | −260.00 |
| 7 | 12 | 265.85 |
| 8 | 14 | 229.38 |
| 9 | 16 | 155.32 |
| 10 | 18 | −16.68 |
| 11 | 20 | 17.58 |
| 12 | 21 | −12.05 |
| 13 | 23 | 43.24 |
| 14 | 25 | −20.55 |
| 15 | 26 | 42.75 |
| 16 | 28 | 99.19 |
| 17 | 30 | 104.54 |
| 18 | 33 | 137.62 |
| 19 | 34 | −293.76 |
| 20 | 36 | 65.11 |
| 21 | 38 | −23.46 |
| 22 | 39 | 35.96 |
| 23 | 41 | 28.18 |
| 24 | 42 | −23.27 |
| 25 | 44 | 39.90 |
| 26 | 46 | 0.00 |
| 27 | 47 | 0.00 |

Numerical Value Example 2

Unit: mm

Surface Data

| Surface Number i | ri | di | ndi | vdi | Effective Diameter |
|---|---|---|---|---|---|
| 1 | 892.139 | 2.20 | 1.80518 | 25.4 | 82.37 |
| 2 | 178.696 | 8.37 | | | 79.85 |
| 3 | −237.577 | 2.00 | 1.80100 | 35.0 | 79.65 |
| 4 | −850.909 | 5.79 | 1.43387 | 95.1 | 79.33 |
| 5 | −176.156 | 0.20 | | | 79.08 |
| 6 | 360.351 | 6.40 | 1.43387 | 95.1 | 76.53 |
| 7 | −246.449 | 8.45 | | | 76.07 |
| 8 | −612.304 | 8.60 | 1.43387 | 95.1 | 74.87 |
| 9 | −91.847 | 1.68 | | | 74.11 |
| 10 | −79.823 | 2.40 | 1.74950 | 35.3 | 73.45 |
| 11 | −144.586 | 0.15 | | | 73.03 |
| 12 | 251.799 | 5.28 | 1.59522 | 67.7 | 69.35 |
| 13 | −753.603 | 0.20 | | | 68.98 |
| 14 | 730.641 | 5.53 | 1.59522 | 67.7 | 68.38 |
| 15 | −178.346 | 0.47 | | | 68.02 |
| 16 | 49.690 | 5.63 | 1.76385 | 48.5 | 57.47 |
| 17 | 84.933 | (Variable) | | | 56.34 |
| 18* | 247.651 | 1.07 | 2.00330 | 28.3 | 25.43 |
| 19 | 15.594 | 4.98 | | | 20.97 |
| 20 | −469.535 | 6.83 | 1.80809 | 22.8 | 20.74 |
| 21 | −14.073 | 0.81 | 1.88300 | 40.8 | 20.40 |
| 22 | 41.250 | 0.23 | | | 20.11 |
| 23 | 29.154 | 3.20 | 1.76182 | 26.5 | 20.42 |
| 24 | 1130.046 | (Variable) | | | 20.25 |
| 25 | −19.884 | 0.75 | 1.75700 | 47.8 | 16.72 |
| 26 | 95.503 | 4.07 | 1.84649 | 23.9 | 18.29 |
| 27 | −67.818 | (Variable) | | | 19.69 |
| 28 | −143.762 | 2.69 | 1.64000 | 60.1 | 25.98 |
| 29 | −41.531 | 0.15 | | | 26.49 |
| 30 | 75.123 | 3.05 | 1.51633 | 64.1 | 27.66 |
| 31 | −156.122 | (Variable) | | | 27.75 |
| 32 (Stop) | ∞ | 0.74 | | | 27.91 |
| 33 | 40.152 | 3.50 | 1.58913 | 61.1 | 28.01 |
| 34 | 62.590 | 2.00 | 1.95375 | 32.3 | 27.38 |
| 35 | 50.723 | 32.00 | | | 26.72 |
| 36 | 30.620 | 4.41 | 1.48749 | 70.2 | 25.14 |
| 37 | −2546.345 | 0.20 | | | 24.60 |
| 38 | 664.647 | 1.00 | 1.88300 | 40.8 | 24.43 |
| 39 | 19.232 | 6.76 | 1.49700 | 81.5 | 23.13 |
| 40 | −205.684 | 0.16 | | | 23.22 |
| 41 | 47.975 | 7.12 | 1.54814 | 45.8 | 23.40 |
| 42 | −22.941 | 1.00 | 1.88300 | 40.8 | 23.38 |
| 43 | 1269.409 | 1.52 | | | 24.23 |
| 44 | 44.309 | 7.40 | 1.48749 | 70.2 | 25.57 |
| 45 | −33.148 | 4.50 | | | 25.74 |
| 46 | ∞ | 33.00 | 1.60859 | 46.4 | 40.00 |
| 47 | ∞ | 13.20 | 1.51633 | 64.1 | 40.00 |
| 48 | ∞ | 7.22 | | | 40.00 |
| Image Plane | ∞ | | | | |

Aspheric Surface Data
18th Surface k = 2.24654e+002
A4 = 8.31929e−006
A6 = −1.10823e−008
A8 = 3.52816e−011
A10 = −6.98654e−013
A12 = 2.01673e−015

Various Data
Zoom Ratio 17.04

| Focal Length | 9.00 | 11.99 | 33.42 | 78.05 | 153.36 |
|---|---|---|---|---|---|
| F-NUMBER | 1.90 | 1.90 | 1.89 | 1.90 | 2.70 |
| Half Angle of View | 31.43 | 24.65 | 9.35 | 4.03 | 2.05 |
| Image Height | 5.50 | 5.50 | 5.50 | 5.50 | 5.50 |
| Lens Total Length | 279.99 | 279.99 | 279.99 | 279.99 | 279.99 |
| BF | 7.22 | 7.22 | 7.22 | 7.22 | 7.22 |
| d17 | 1.26 | 11.29 | 35.13 | 46.29 | 50.95 |
| d24 | 44.18 | 35.81 | 11.87 | 5.87 | 4.30 |
| d27 | 9.42 | 10.46 | 13.25 | 9.87 | 1.43 |
| d31 | 8.23 | 5.53 | 2.85 | 1.07 | 6.42 |
| d48 | 7.22 | 7.22 | 7.22 | 7.22 | 7.22 |
| Entrance Pupil Position | 61.11 | 80.20 | 188.65 | 377.79 | 617.06 |

-continued

Unit: mm

| | | | | | |
|---|---|---|---|---|---|
| Exit Pupil Position | 1048.11 | 1048.11 | 1048.11 | 1048.11 | 1048.11 |
| Front Side Principal Point Position | 70.19 | 92.32 | 223.14 | 461.69 | 793.02 |
| Rear Side Principal Point Position | −1.78 | −4.77 | −26.20 | −70.83 | −146.14 |

Zooming lens unit Data

| Unit | Start Surface | Focal Length | Lens Structure Length | Front Side Principal Point Position | Rear Side Principal Point Position |
|---|---|---|---|---|---|
| 1 | 1 | 68.70 | 63.35 | 42.41 | 0.12 |
| 2 | 18 | −15.70 | 17.72 | 0.71 | −11.05 |
| 3 | 25 | −42.70 | 4.82 | −1.43 | −4.19 |
| 4 | 28 | 47.01 | 5.88 | 2.35 | −1.44 |
| 5 | 32 | 51.59 | 118.51 | 54.13 | −49.42 |

Stroke Length of Focusing Unit in Focusing to Minimum Distance

| Unit | Start Surface | End Surface | Stroke in Focusing |
|---|---|---|---|
| 1 | 8 | 15 | −7.97 |
| 1 | 16 | 17 | −4.58 |

Individual Lens Data

| Lens | Start Surface | Focal Length |
|---|---|---|
| 1 | 1 | −275.35 |
| 2 | 3 | −409.32 |
| 3 | 4 | 509.40 |
| 4 | 6 | 337.56 |
| 5 | 8 | 247.19 |
| 6 | 10 | −240.01 |
| 7 | 12 | 316.60 |
| 8 | 14 | 240.54 |
| 9 | 16 | 145.89 |
| 10 | 18 | −16.49 |
| 11 | 20 | 17.65 |
| 12 | 21 | −11.74 |
| 13 | 23 | 38.89 |
| 14 | 25 | −21.57 |
| 15 | 26 | 46.93 |
| 16 | 28 | 89.97 |
| 17 | 30 | 98.31 |
| 18 | 33 | 179.00 |
| 19 | 34 | −303.53 |
| 20 | 36 | 61.89 |
| 21 | 38 | −22.32 |
| 22 | 39 | 35.64 |
| 23 | 41 | 29.21 |
| 24 | 42 | −25.36 |
| 25 | 44 | 40.02 |
| 26 | 46 | 0.00 |
| 27 | 47 | 0.00 |

Numerical Value Example 3

Unit: mm

Surface Data

| Surface Number i | ri | di | ndi | vdi | Effective Diameter |
|---|---|---|---|---|---|
| 1 | −1406.717 | 2.70 | 1.80518 | 25.4 | 84.99 |
| 2 | 147.731 | 4.51 | | | 81.78 |
| 3 | 486.582 | 4.50 | 1.43387 | 95.1 | 81.69 |
| 4 | −474.288 | 0.20 | | | 81.52 |
| 5 | 220.132 | 7.40 | 1.43387 | 95.1 | 79.67 |
| 6 | −339.241 | 9.93 | | | 79.18 |
| 7 | −445.896 | 5.77 | 1.43387 | 95.1 | 78.55 |
| 8 | −127.036 | 3.58 | | | 78.06 |
| 9 | −86.137 | 2.40 | 1.74950 | 35.3 | 77.61 |
| 10 | −125.838 | 0.15 | | | 77.67 |
| 11 | 213.345 | 6.68 | 1.59522 | 67.7 | 72.90 |
| 12 | −399.522 | 0.20 | | | 72.04 |
| 13 | −749.081 | 4.50 | 1.59522 | 67.7 | 71.17 |
| 14 | −158.260 | 0.47 | | | 70.51 |
| 15 | 50.322 | 6.03 | 1.76385 | 48.5 | 58.25 |
| 16 | 90.862 | (Variable) | | | 56.96 |
| 17* | 337.082 | 1.07 | 2.00330 | 28.3 | 26.49 |
| 18 | 16.239 | 5.20 | | | 21.76 |
| 19 | −280.580 | 7.34 | 1.80809 | 22.8 | 21.49 |
| 20 | −14.062 | 0.81 | 1.88300 | 40.8 | 21.09 |
| 21 | 43.498 | 0.23 | | | 20.76 |
| 22 | 31.192 | 3.22 | 1.76182 | 26.5 | 21.05 |
| 23 | 34687.188 | (Variable) | | | 20.89 |
| 24 | −20.430 | 0.75 | 1.75700 | 47.8 | 16.61 |
| 25 | 58.475 | 4.71 | 1.84649 | 23.9 | 18.23 |
| 26 | −77.616 | (Variable) | | | 19.76 |
| 27 | −187.751 | 2.52 | 1.64000 | 60.1 | 26.90 |
| 28 | −49.710 | 0.15 | | | 27.38 |
| 29 | 102.301 | 2.59 | 1.51633 | 64.1 | 28.46 |
| 30 | −181.619 | (Variable) | | | 28.60 |
| 31 (Stop) | ∞ | 0.74 | | | 28.86 |
| 32 | 68.861 | 3.50 | 1.58913 | 61.1 | 29.13 |
| 33 | 454.188 | 2.00 | 1.95375 | 32.3 | 28.95 |
| 34 | 190.491 | 32.00 | | | 28.76 |
| 35 | 27.052 | 9.63 | 1.48749 | 70.2 | 28.20 |
| 36 | −67.362 | 0.20 | | | 26.47 |
| 37 | −122.863 | 1.00 | 1.88300 | 40.8 | 25.74 |
| 38 | 20.863 | 6.72 | 1.49700 | 81.5 | 23.99 |
| 39 | −153.524 | 0.18 | | | 23.86 |
| 40 | 80.179 | 6.21 | 1.54814 | 45.8 | 23.62 |
| 41 | −23.759 | 1.00 | 1.88300 | 40.8 | 23.37 |
| 42 | −150.817 | 0.20 | | | 23.98 |
| 43 | 34.349 | 5.45 | 1.48749 | 70.2 | 24.50 |
| 44 | −101.745 | 4.50 | | | 24.18 |
| 45 | ∞ | 33.00 | 1.60859 | 46.4 | 40.00 |
| 46 | ∞ | 13.20 | 1.51633 | 64.1 | 40.00 |
| 47 | ∞ | 7.20 | | | 40.00 |
| Image Plane | | | | | |

Aspheric Surface Data
17th Surface k = −1.48284e+002
A4 = 1.04235e−005
A6 = −1.41408e−008
A8 = 2.57126e−011
A10 = −1.43958e−013
A12 = 4.94899e−016

Various Data
Zoom Ratio 17.55

| | | | | | |
|---|---|---|---|---|---|
| Focal Length | 9.00 | 12.01 | 33.42 | 77.99 | 157.92 |
| F-NUMBER | 1.90 | 1.90 | 1.89 | 1.90 | 2.70 |
| Half Angle of View | 31.43 | 24.61 | 9.34 | 4.03 | 1.99 |

-continued

| Unit: mm | | | | |
|---|---|---|---|---|
| Image Height | 5.50 | 5.50 | 5.50 | 5.50 | 5.50 |
| Lens Total Length | 277.68 | 277.68 | 277.68 | 277.68 | 277.68 |
| BF | 7.20 | 7.20 | 7.20 | 7.20 | 7.20 |
| d16 | 1.31 | 10.83 | 33.90 | 44.74 | 49.50 |
| d23 | 45.74 | 36.77 | 12.48 | 6.51 | 4.46 |
| d26 | 10.40 | 11.55 | 14.33 | 10.99 | 1.49 |
| d30 | 5.89 | 4.19 | 2.63 | 1.10 | 7.90 |
| d47 | 7.20 | 7.20 | 7.20 | 7.20 | 7.20 |
| Entrance Pupil Position | 60.67 | 79.96 | 191.40 | 387.70 | 657.75 |
| Exit Pupil Position | −470.95 | −470.95 | −470.95 | −470.95 | −470.95 |
| Front Side Principal Point Position | 69.50 | 91.66 | 222.48 | 452.97 | 763.51 |
| Rear Side Principal Point Position | −1.80 | −4.80 | −26.22 | −70.79 | −150.72 |

Zooming lens unit Data

| Unit | Start Surface | Focal Length | Lens Structure Length | Front Side Principal Point Position | Rear Side Principal Point Position |
|---|---|---|---|---|---|
| 1 | 1 | 68.70 | 59.02 | 38.94 | −1.53 |
| 2 | 17 | −15.70 | 17.87 | 0.79 | −11.48 |
| 3 | 24 | −42.70 | 5.46 | −1.42 | −4.54 |
| 4 | 27 | 57.31 | 5.26 | 2.17 | −1.22 |
| 5 | 31 | 51.54 | 119.53 | 45.83 | −57.57 |

Stroke Length of Focusing Unit in Focusing to Minimum Distance

| Unit | Start Surface | End Surface | Stroke in Focusing |
|---|---|---|---|
| 1 | 7 | 14 | −9.13 |
| 1 | 15 | 16 | −4.43 |

Individual Lens Data

| Lens | Start Surface | Focal Length |
|---|---|---|
| 1 | 1 | −164.39 |
| 2 | 3 | 552.97 |
| 3 | 5 | 308.17 |
| 4 | 7 | 406.19 |
| 5 | 9 | −371.51 |
| 6 | 11 | 233.79 |
| 7 | 13 | 334.97 |
| 8 | 15 | 138.02 |
| 9 | 17 | −16.89 |
| 10 | 19 | 17.91 |
| 11 | 20 | −11.89 |
| 12 | 22 | 40.62 |
| 13 | 24 | −19.82 |
| 14 | 25 | 39.65 |
| 15 | 27 | 104.48 |
| 16 | 29 | 126.67 |
| 17 | 32 | 136.78 |
| 18 | 33 | −342.78 |
| 19 | 35 | 40.83 |
| 20 | 37 | −20.01 |
| 21 | 38 | 37.33 |
| 22 | 40 | 33.98 |
| 23 | 41 | −31.87 |
| 24 | 43 | 53.20 |
| 25 | 45 | 0.00 |
| 26 | 46 | 0.00 |

Numerical Value Example 4

| Unit: mm | | | | | |
|---|---|---|---|---|---|
| Surface Data | | | | | |
| Surface Number i | ri | di | ndi | vdi | Effective Diameter |
| 1 | 2248.021 | 2.50 | 1.80518 | 25.4 | 84.27 |
| 2 | 160.629 | 12.90 | | | 81.14 |
| 3 | −313.466 | 3.00 | 1.80100 | 35.0 | 79.32 |
| 4 | −513.474 | 5.76 | 1.43387 | 95.1 | 79.01 |
| 5 | −196.205 | 0.20 | | | 78.56 |
| 6 | 651.159 | 5.37 | 1.43387 | 95.1 | 76.52 |
| 7 | −408.511 | 5.86 | | | 75.76 |
| 8 | 236.118 | 9.94 | 1.43387 | 95.1 | 73.21 |
| 9 | −139.078 | 4.36 | | | 72.13 |
| 10 | −80.825 | 2.40 | 1.74950 | 35.3 | 71.65 |
| 11 | −121.703 | 0.15 | | | 72.64 |
| 12 | 152.163 | 6.55 | 1.59522 | 67.7 | 71.25 |
| 13 | −623.002 | 0.40 | | | 70.90 |
| 14 | 410.096 | 5.50 | 1.59522 | 67.7 | 69.43 |
| 15 | −214.412 | 0.47 | | | 68.96 |
| 16 | 47.971 | 3.81 | 1.76385 | 48.5 | 58.27 |
| 17 | 61.888 | (Variable) | | | 57.19 |
| 18* | 191.170 | 1.07 | 2.00330 | 28.3 | 25.85 |
| 19 | 15.705 | 5.00 | | | 21.33 |
| 20 | −6880.605 | 6.99 | 1.80809 | 22.8 | 21.11 |
| 21 | −14.476 | 0.81 | 1.88300 | 40.8 | 20.70 |
| 22 | 39.831 | 0.23 | | | 20.29 |
| 23 | 28.532 | 3.08 | 1.76182 | 26.5 | 20.59 |
| 24 | 263.545 | (Variable) | | | 20.40 |
| 25 | −20.095 | 0.75 | 1.75700 | 47.8 | 16.97 |
| 26 | 72.909 | 4.77 | 1.84649 | 23.9 | 18.66 |
| 27 | −72.277 | (Variable) | | | 20.31 |
| 28 | −144.939 | 3.79 | 1.64000 | 60.1 | 26.85 |
| 29 | −42.961 | 0.15 | | | 27.83 |
| 30 | 95.910 | 2.76 | 1.51633 | 64.1 | 29.01 |
| 31 | −116.983 | (Variable) | | | 29.09 |
| 32 (Stop) | ∞ | 0.74 | | | 29.29 |
| 33 | 42.113 | 3.50 | 1.58913 | 61.1 | 29.40 |
| 34 | 117.209 | 2.00 | 1.95375 | 32.3 | 28.96 |
| 35 | 69.391 | 32.00 | | | 28.31 |
| 36 | 30.890 | 4.18 | 1.48749 | 70.2 | 25.15 |
| 37 | 282.321 | 0.50 | | | 24.53 |
| 38 | 818.949 | 1.00 | 1.88300 | 40.8 | 24.38 |
| 39 | 19.568 | 6.77 | 1.49700 | 81.5 | 23.13 |
| 40 | −158.941 | 0.19 | | | 23.22 |
| 41 | 50.338 | 7.39 | 1.54814 | 45.8 | 23.21 |
| 42 | −21.211 | 1.00 | 1.88300 | 40.8 | 23.18 |
| 43 | −1426.194 | 1.52 | | | 24.14 |
| 44 | 54.032 | 7.34 | 1.48749 | 70.2 | 25.38 |
| 45 | −29.614 | 4.50 | | | 25.67 |
| 46 | ∞ | 33.00 | 1.60859 | 46.4 | 40.00 |
| 47 | ∞ | 13.20 | 1.51633 | 64.1 | 40.00 |
| 48 | ∞ | 7.22 | | | 40.00 |
| Image Plane | ∞ | | | | |

Aspheric Surface Data
18th Surface k = 1.06416e+002
A4 = 8.62776e−006
A6 = −2.33905e−008
A8 = 1.02204e−010

-continued

Unit: mm

A10 = −4.46300e−013
A12 = 7.67037e−016

Various Data
Zoom Ratio 17.61

| | | | | | |
|---|---|---|---|---|---|
| Focal Length | 9.00 | 11.74 | 33.05 | 78.03 | 158.50 |
| F-NUMBER | 1.90 | 1.90 | 1.90 | 1.90 | 2.70 |
| Half Angle of View | 31.43 | 25.10 | 9.45 | 4.03 | 1.99 |
| Image Height | 5.50 | 5.50 | 5.50 | 5.50 | 5.50 |
| Lens Total Length | 289.73 | 289.73 | 289.73 | 289.73 | 289.73 |
| BF | 7.22 | 7.22 | 7.22 | 7.22 | 7.22 |
| d17 | 1.53 | 11.05 | 35.83 | 46.97 | 51.76 |
| d24 | 45.24 | 37.66 | 14.93 | 7.63 | 4.51 |
| d27 | 9.76 | 10.69 | 13.16 | 10.13 | 1.47 |
| d31 | 8.59 | 5.72 | 1.20 | 0.39 | 7.39 |
| d48 | 7.22 | 7.22 | 7.22 | 7.22 | 7.22 |
| Entrance Pupil Position | 64.50 | 82.17 | 194.36 | 386.68 | 638.29 |
| Exit Pupil Position | 3425.80 | 3425.80 | 3425.80 | 3425.80 | 3425.80 |
| Front Side Principal Point Position | 73.52 | 93.95 | 227.72 | 466.49 | 804.15 |
| Rear Side Principal Point Position | −1.78 | −4.52 | −25.83 | −70.81 | −151.29 |

Zooming lens unit Data

| Unit | Start Surface | Focal Length | Lens Structure Length | Front Side Principal Point Position | Rear Side Principal Point Position |
|---|---|---|---|---|---|
| 1 | 1 | 68.70 | 69.17 | 46.46 | 1.12 |
| 2 | 18 | −15.70 | 17.17 | 1.00 | −10.57 |
| 3 | 25 | −42.70 | 5.52 | −1.54 | −4.70 |
| 4 | 28 | 48.86 | 6.71 | 3.24 | −1.01 |
| 5 | 32 | 54.15 | 118.83 | 55.01 | −52.17 |

Stroke Length of Focusing Unit in Focusing to Minimum Distance

| Unit | Start Surface | End Surface | Stroke in Focusing |
|---|---|---|---|
| 1 | 8 | 15 | −6.25 |
| 1 | 16 | 17 | −4.77 |

Individual Lens Data

| Lens | Start Surface | Focal Length |
|---|---|---|
| 1 | 1 | −212.99 |
| 2 | 3 | −1004.65 |
| 3 | 4 | 726.05 |
| 4 | 6 | 578.01 |
| 5 | 8 | 202.85 |
| 6 | 10 | −327.18 |
| 7 | 12 | 205.39 |
| 8 | 14 | 236.50 |
| 9 | 16 | 248.42 |
| 10 | 18 | −16.97 |
| 11 | 20 | 17.76 |
| 12 | 21 | −11.87 |
| 13 | 23 | 41.39 |
| 14 | 25 | −20.63 |
| 15 | 26 | 43.11 |
| 16 | 28 | 93.66 |
| 17 | 30 | 102.14 |
| 18 | 33 | 109.25 |
| 19 | 34 | −180.75 |
| 20 | 36 | 70.52 |
| 21 | 38 | −22.59 |
| 22 | 39 | 35.40 |
| 23 | 41 | 28.12 |
| 24 | 42 | −24.25 |
| 25 | 44 | 40.27 |
| 26 | 46 | 0.00 |
| 27 | 47 | 0.00 |

Numerical Value Example 5

Unit: mm

Surface Data

| Surface Number i | ri | di | ndi | vdi | Effective Diameter |
|---|---|---|---|---|---|
| 1 | −429.328 | 2.70 | 1.80518 | 25.4 | 97.81 |
| 2 | 201.712 | 15.95 | | | 92.64 |
| 3 | −1044.459 | 2.70 | 1.80100 | 35.0 | 88.78 |
| 4 | 4310.260 | 8.54 | 1.43387 | 95.1 | 88.59 |
| 5 | −206.347 | 0.20 | | | 88.39 |
| 6 | 600.443 | 5.16 | 1.43387 | 95.1 | 86.56 |
| 7 | −536.686 | 7.51 | | | 86.11 |
| 8 | 553.752 | 12.40 | 1.43387 | 95.1 | 84.50 |
| 9 | −104.648 | 1.56 | | | 83.82 |
| 10 | −92.988 | 2.40 | 1.74950 | 35.3 | 83.32 |
| 11 | −134.213 | 0.15 | | | 83.09 |
| 12 | 135.181 | 8.40 | 1.59522 | 67.7 | 82.88 |
| 13 | −1702.192 | 0.50 | | | 82.56 |
| 14 | 504.408 | 5.00 | 1.59522 | 67.7 | 81.48 |
| 15 | −366.848 | 0.43 | | | 81.14 |
| 16 | 56.306 | 5.76 | 1.76385 | 48.5 | 70.93 |
| 17 | 80.422 | (Variable) | | | 69.73 |
| 18 | 169.846 | 0.90 | 1.88300 | 40.8 | 24.63 |
| 19 | 16.683 | 4.92 | | | 20.49 |
| 20 | −58.456 | 6.77 | 1.80809 | 22.8 | 20.14 |
| 21 | −12.881 | 0.70 | 1.88300 | 40.8 | 19.59 |
| 22 | 51.148 | 0.20 | | | 19.14 |
| 23 | 27.917 | 2.82 | 1.66680 | 33.0 | 19.34 |
| 24 | 125.726 | (Variable) | | | 19.09 |
| 25 | −30.886 | 0.75 | 1.75700 | 47.8 | 19.19 |
| 26 | 32.930 | 3.09 | 1.84649 | 23.9 | 20.85 |
| 27 | 466.481 | (Variable) | | | 21.39 |
| 28 (Stop) | ∞ | 1.30 | | | 27.17 |
| 29 | −242.118 | 3.35 | 1.63854 | 55.4 | 27.83 |
| 30 | −45.375 | 0.15 | | | 28.53 |
| 31 | 144.059 | 3.23 | 1.51633 | 64.1 | 29.71 |
| 32 | −114.003 | 0.15 | | | 29.96 |
| 33 | 53.065 | 7.18 | 1.51742 | 52.4 | 30.35 |
| 34 | −32.276 | 0.90 | 1.83481 | 42.7 | 30.19 |
| 35 | −199.215 | 32.40 | | | 30.52 |
| 36 | 70.206 | 6.24 | 1.49700 | 81.5 | 31.13 |
| 37 | −47.662 | 0.32 | | | 30.86 |
| 38 | 174.302 | 1.40 | 1.83403 | 37.2 | 28.77 |
| 39 | 26.028 | 6.86 | 1.48749 | 70.2 | 26.96 |
| 40 | −160.718 | 2.03 | | | 26.48 |
| 41 | 79.858 | 8.37 | 1.50127 | 56.5 | 25.84 |
| 42 | −22.160 | 1.40 | 1.83481 | 42.7 | 25.06 |
| 43 | 131.068 | 0.15 | | | 25.49 |
| 44 | 39.788 | 5.73 | 1.50127 | 56.5 | 26.01 |
| 45 | −47.878 | 4.00 | | | 25.94 |
| 46 | ∞ | 33.00 | 1.60859 | 46.4 | 40.00 |
| 47 | ∞ | 13.20 | 1.51633 | 64.1 | 40.00 |

-continued

Unit: mm

| | | | | | |
|---|---|---|---|---|---|
| 48 | ∞ | 7.60 | | 40.00 | |
| Image Plane | ∞ | | | | |

Various Data
Zoom Ratio 24.00

| | | | | | |
|---|---|---|---|---|---|
| Focal Length | 8.00 | 16.00 | 32.00 | 64.00 | 192.00 |
| F-NUMBER | 1.90 | 1.90 | 1.90 | 1.90 | 2.80 |
| Half Angle of View | 34.51 | 18.97 | 9.75 | 4.91 | 1.64 |
| Image Height | 5.50 | 5.50 | 5.50 | 5.50 | 5.50 |
| Lens Total Length | 302.00 | 302.00 | 302.00 | 302.00 | 302.00 |
| BF | 7.60 | 7.60 | 7.60 | 7.60 | 7.60 |
| d17 | 1.43 | 22.71 | 37.04 | 46.67 | 54.90 |
| d24 | 54.14 | 29.65 | 12.83 | 3.48 | 7.87 |
| d27 | 7.96 | 11.16 | 13.65 | 13.38 | 0.76 |
| d48 | 7.60 | 7.60 | 7.60 | 7.60 | 7.60 |
| Entrance Pupil Position | 64.98 | 110.52 | 183.30 | 300.80 | 641.74 |
| Exit Pupil Position | −2723.63 | −2723.63 | −2723.63 | −2723.63 | −2723.63 |
| Front Side Principal Point Position | 72.96 | 126.43 | 214.93 | 363.30 | 820.25 |
| Rear Side Principal Point Position | −0.40 | −8.40 | −24.40 | −56.40 | −184.40 |

Zooming lens unit Data

| Unit | Start Surface | Focal Length | Lens Structure Length | Front Side Principal Point Position | Rear Side Principal Point Position |
|---|---|---|---|---|---|
| 1 | 1 | 67.97 | 79.35 | 51.79 | 4.13 |
| 2 | 18 | −13.99 | 16.30 | 2.06 | −8.79 |

-continued

Unit: mm

| | | | | | |
|---|---|---|---|---|---|
| 3 | 25 | −42.26 | 3.84 | 0.11 | −1.98 |
| 4 | 28 | 49.11 | 131.36 | 48.21 | −107.13 |

Stroke Length of Focusing Unit in Focusing to Minimum Distance

| Unit | Start Surface | End Surface | Stroke in Focusing |
|---|---|---|---|
| 1 | 8 | 15 | −7.02 |
| 1 | 16 | 17 | −5.47 |

Individual Lens Data

| Lens | Start Surface | Focal Length |
|---|---|---|
| 1 | 1 | −168.55 |
| 2 | 3 | −1042.31 |
| 3 | 4 | 452.99 |
| 4 | 6 | 652.42 |
| 5 | 8 | 203.51 |
| 6 | 10 | −411.52 |
| 7 | 12 | 210.02 |
| 8 | 14 | 356.33 |
| 9 | 16 | 221.63 |
| 10 | 18 | −20.89 |
| 11 | 20 | 18.97 |
| 12 | 21 | −11.53 |
| 13 | 23 | 52.82 |
| 14 | 25 | −20.84 |
| 15 | 26 | 41.31 |
| 16 | 29 | 86.50 |
| 17 | 31 | 123.33 |
| 18 | 33 | 39.76 |
| 19 | 34 | −46.00 |
| 20 | 36 | 57.98 |
| 21 | 38 | −36.61 |
| 22 | 39 | 46.35 |
| 23 | 41 | 35.43 |
| 24 | 42 | −22.49 |
| 25 | 44 | 44.13 |
| 26 | 46 | 0.00 |
| 27 | 47 | 0.00 |

TABLE 1

| | Conditional Expression | | | Example | | | |
|---|---|---|---|---|---|---|---|
| | Lower Limit | Upper Limit | 1 | 2 | 3 | 4 | 5 |
| Focal Length of First Unit | f1 | — | — | 68.70 | 68.70 | 68.70 | 68.70 | 68.00 |
| Focal Length of Second Unit | f2 | — | — | −15.70 | −15.70 | −15.70 | −15.70 | −14.00 |
| Focal Length of First Sub-Unit | f11 | — | — | −718.80 | −1164.60 | −1272.00 | −436.60 | −373.10 |
| Focal Length of Second Sub-Unit | f12 | — | — | 123.60 | 140.00 | 143.30 | 94.50 | 101.90 |
| Focal Length of Third Sub-Unit | f13 | — | — | 155.30 | 145.90 | 138.00 | 248.40 | 221.60 |
| Focal Length of Negative Meniscus Lens | f12n | — | — | −260.00 | −240.00 | −371.50 | −327.20 | −411.50 |
| Object-Side Curvature Radius of Negative Meniscus Lens | R1 | — | — | −80.40 | −79.80 | −86.10 | −80.80 | −93.00 |

TABLE 1-continued

| | | Conditional Expression | | Example | | | | |
|---|---|---|---|---|---|---|---|---|
| | | Lower Limit | Upper Limit | 1 | 2 | 3 | 4 | 5 |
| Image-Side Curvature Radius of Negative Meniscus Lens | R2 | — | — | −138.00 | −144.60 | −125.80 | −121.70 | −134.20 |
| Expression (1) | φ12n/φ12 | −0.60 | −0.20 | −0.48 | −0.58 | −0.39 | −0.29 | −0.25 |
| Expression (2) | φ12/φ1 | 0.40 | 0.80 | 0.56 | 0.49 | 0.48 | 0.73 | 0.67 |
| Expression (3) | φ13/φ1 | 0.20 | 0.60 | 0.44 | 0.47 | 0.50 | 0.28 | 0.31 |
| Expression (4) | φ12/φ13 | 0.50 | 3.00 | 1.26 | 1.04 | 0.96 | 2.63 | 2.27 |
| Expression (5) | SF12n | 3.00 | 6.00 | 3.79 | 3.46 | 5.34 | 4.95 | 5.51 |
| Expression (6) | ftele/fwide | 15.00 | 25.00 | 15.92 | 17.04 | 17.55 | 17.61 | 24.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194523, filed Sep. 30, 2015, which is hereby incorporated by reference herein in its entirety.

What is claimed is:

1. A zoom lens comprising in order from an object side to an image side:
   a first lens unit having a positive refractive power and configured not to be moved for zooming;
   a second lens unit having a negative refractive power and configured to be moved for zooming;
   at least one zooming lens unit configured to be moved for zooming;
   a stop; and
   a fixed lens unit having a positive refractive power and configured not to be moved for zooming,
   wherein the first lens unit comprises in order from the object side to the image side:
      a first lens sub-unit configured not to be moved for focusing;
      a second lens sub-unit having a positive refractive power and configured to be moved toward the object side for focusing to an object at short distance from an object at infinite distance; and
      a third lens sub-unit having a positive refractive power and configured to be moved for focusing,
   wherein the second lens sub-unit includes a negative meniscus lens having a convex surface facing the image side,
   wherein the second lens sub-unit and the third lens sub-unit are configured to be moved along respective loci different from each other for focusing to the object at short distance from the object at infinite distance, and
   wherein the zoom lens satisfies a conditional expression $-0.60 < \varphi 12n/\varphi 12 < -0.20$ where φ12n denotes a refractive power of the negative meniscus lens, and φ12 denotes a refractive power of the second lens sub-unit.

2. The zoom lens according to claim 1, wherein the zoom lens satisfies conditional expressions $0.40 < \varphi 12/\varphi 1 < 0.80$, $0.20 < \varphi 13/\varphi 1 < 0.60$, and $0.50 < \varphi 12/\varphi 13 < 3.00$, where φ13 denotes a refractive power of the third lens sub-unit, and φ1 denotes a refractive power of the first lens unit.

3. The zoom lens according to claim 1, wherein the zoom lens satisfies a conditional expression $3.00 < (R2+R1)/(R2-R1) < 6.00$ where R1 denotes a curvature radius of a surface of the negative meniscus lens on an object side thereof, and R2 denotes a curvature radius of a surface of the negative meniscus lens on an image side thereof.

4. The zoom lens according to claim 1, wherein the zoom lens satisfies a conditional expression $15.00 < ftele/fwide < 25.00$ where fwide denotes a focal length of the zoom lens at a wide angle end thereof, and ftele denotes a focal length of the zoom lens at a telephoto end thereof.

5. The zoom lens according to claim 1, wherein the third lens sub-unit is configured to be moved toward the object side for focusing to the object at short distance from the object at infinite distance.

6. An image pickup apparatus comprising:
   a zoom lens, the zoom lens comprising in order from an object side to an image side:
      a first lens unit having a positive refractive power and configured not to be moved for zooming;
      a second lens unit having a negative refractive power and configured to be moved for zooming;
      at least one zooming lens unit configured to be moved for zooming;
      a stop; and
      a fixed lens unit having a positive refractive power and configured not to be moved for zooming,
      wherein the first lens unit comprises in order from the object side to the image side:
         a first lens sub-unit configured not to be moved for focusing;
         a second lens sub-unit having a positive refractive power and configured to be moved toward the object side for focusing to an object at short distance from an object at infinite distance; and
         a third lens sub-unit having a positive refractive power and configured to be moved for focusing,
      wherein the second lens sub-unit includes a negative meniscus lens having a convex surface facing the image side, wherein the second lens sub-unit and the third lens sub-unit are configured to be moved along respective loci different from each other for focusing to the object at short distance from the object at infinite distance; and wherein the zoom lens satisfies a conditional expression $$-0.60 < \varphi 12n/\varphi 12 < -0.20$$

where $\varphi 12n$ denotes a refractive power of the negative meniscus lens, and $\varphi 12$ denotes a refractive power of the second lens sub-unit; and an image pickup element configured to receive image formed by the zoom lens.

* * * * *